US012183039B2

(12) United States Patent
Deng et al.

(10) Patent No.: US 12,183,039 B2
(45) Date of Patent: Dec. 31, 2024

(54) CAMERA CALIBRATION

(71) Applicant: Microsoft Technology Licensing, LLC, Redmond, WA (US)

(72) Inventors: Hongli Deng, Bellevue, WA (US); Duong Nguyen, Bellevue, WA (US); Gabriel Blanco Saldana, Kirkland, WA (US); Ryan S. Menezes, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 444 days.

(21) Appl. No.: 17/717,354

(22) Filed: Apr. 11, 2022

(65) Prior Publication Data

US 2023/0326076 A1 Oct. 12, 2023

(51) Int. Cl.
*G06T 7/80* (2017.01)
*G06F 3/01* (2006.01)
*G06T 7/55* (2017.01)

(52) U.S. Cl.
CPC .............. *G06T 7/80* (2017.01); *G06F 3/013* (2013.01); *G06F 3/017* (2013.01); *G06T 7/55* (2017.01); *G06T 2207/30196* (2013.01)

(58) Field of Classification Search
CPC ... G06T 7/80; G06T 7/55; G06T 2207/30196; G06F 3/013; G06F 3/017
USPC .......................................................... 382/103
See application file for complete search history.

(56) References Cited

U.S. PATENT DOCUMENTS

| 10,445,898 | B2 * | 10/2019 | Liu .......................... G06T 7/80 |
| 11,082,659 | B2 | 8/2021 | Cutler |
| 11,219,837 | B2 | 1/2022 | Rico et al. |
| 11,226,677 | B2 | 1/2022 | Kur et al. |
| 11,232,643 | B1 | 1/2022 | Stevens et al. |
| 2018/0075593 | A1 | 3/2018 | Wang et al. |
| 2019/0222825 | A1 * | 7/2019 | Lee ...................... H04N 13/246 |

(Continued)

FOREIGN PATENT DOCUMENTS

| EP | 3157255 A1 * | 4/2017 |
| EP | 2904349 B1 | 3/2020 |
| EP | 2798840 B1 | 8/2020 |

OTHER PUBLICATIONS

Li, et al., "Gesture Interaction in Virtual Reality", In Journal of Virtual Reality & Intelligent Hardware, vol. 1, Issue 1, Feb. 1, 2019, pp. 84-112.

(Continued)

*Primary Examiner* — Gabriel I Garcia
(74) *Attorney, Agent, or Firm* — Rainier Patents, P.S.

(57) ABSTRACT

The description relates to cameras, and camera calibration for enhancing user experiences. One example can receive a first image of a user at a first location relative to a camera. The first image can include the user's upper body but does not include the user from head to toe. The example can receive a second image of the user at a second location relative to a camera. The second image can include the user's upper body but does not include the user from head to toe. The example can estimate a distance of the second location from the first location relative to the camera and calibrate a height and tilt angle of the camera from the first image, the second image, and the estimated distance and without a full body image of the user.

4 Claims, 31 Drawing Sheets

(56) References Cited

U.S. PATENT DOCUMENTS

2021/0406527 A1    12/2021  Mehl et al.
2022/0245846 A1*   8/2022   Lee .................... G06T 7/215

OTHER PUBLICATIONS

Park, et al., "Understanding Human Interactions with Track and Body Synergies (TBS) Captured from Multiple Views", In Journal of Computer Vision and Image Understanding, vol. 111, Issue 1, Jul. 1, 2008, pp. 2-20.

Li, et al., "A simplified nonlinear regression method for human height estimation in video surveillance", In journal of EURASIP Journal on Image and Video Processing, vol. 2015, Issue 32, Oct. 12, 2015, 9 Pages.

Nakano, Gaku, "Camera Calibration Using Parallel Line Segments", In Proceedings of the 2020 25th International Conference on Pattern Recognition, Jan. 10, 2021, pp. 1505-1512.

"Invitation to Pay Additional Fees Issued in PCT Application No. PCT/US23/011587", Mailed Date: Jun. 6, 2023, 9 Pages.

"International Search Report and Written Opinion Issued in PCT Application No. PCT/US23/011587", Mailed Date: Jul. 24, 2023, 17 Pages.

* cited by examiner

CAMERA CALIBRATION

BACKGROUND

The discussion relates to camera calibration. Cameras are used in many scenarios, including virtual meetings and presentations. In such cases, cameras are often mounted near the user's display, such as on top of the display. Calibration of the camera can enhance various user experiences with the camera, such as integrating camera data with other data, such as virtual data.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

SUMMARY

This patent relates to cameras, and camera calibration for enhancing user experiences. One example can receive a first image of a user at a first location relative to a camera. The first image can include the user's upper body but does not include the user from head to toe. The example can receive a second image of the user at a second location relative to a camera. The second image can include the user's upper body but does not include the user from head to toe. The example can estimate a distance of the second location from the first location relative to the camera and calibrate a height and tilt angle of the camera from the first image, the second image, and the estimated distance and without a full body image of the user.

This summary is intended to provide a very brief explanation of some of the present concepts and is not intended to be limiting or all-encompassing of the concepts described and claimed in this patent.

DETAILED DESCRIPTION

This discussion relates to camera calibration. Cameras are ubiquitous and their use case scenarios have expanded greatly, such as being employed as webcams. Many of these use case scenarios, such as webcam scenarios, can be enhanced when the camera is calibrated. As used in the present discussion, calibration can be viewed as a contextual understanding of external and/or internal camera parameters. For instance, the calibration can include how high the camera is above a horizontal surface (e.g., the floor or ground) and how much it is tilted (relative to a horizontal plane), among other external parameters. The calibration can also include the focal length of the camera, among other internal parameters.

In traditional use case scenarios involving cameras employed in large conference rooms, the camera could be calibrated by having a user walk around the space so that the camera could capture the whole user (e.g., head to toe) in multiple locations. However, these calibration techniques do not work in more constrained settings, such as cubicles, small conference rooms, home offices, etc.

The present concepts can calibrate the camera utilizing images of the user that include less than the whole user, such as just the user's upper body but not the lower legs and feet. For instance, calibration can be achieved with images that include the upper body of the user from the top of their head to their waist (e.g., pelvis). Some implementations of these concepts can involve capturing images of the user's upper body at two locations that are separated by a known or estimated distance. Other calibration information (e.g., other calibration parameters) can be derived from the images and the distance information. These aspects are discussed below.

Figure 1:
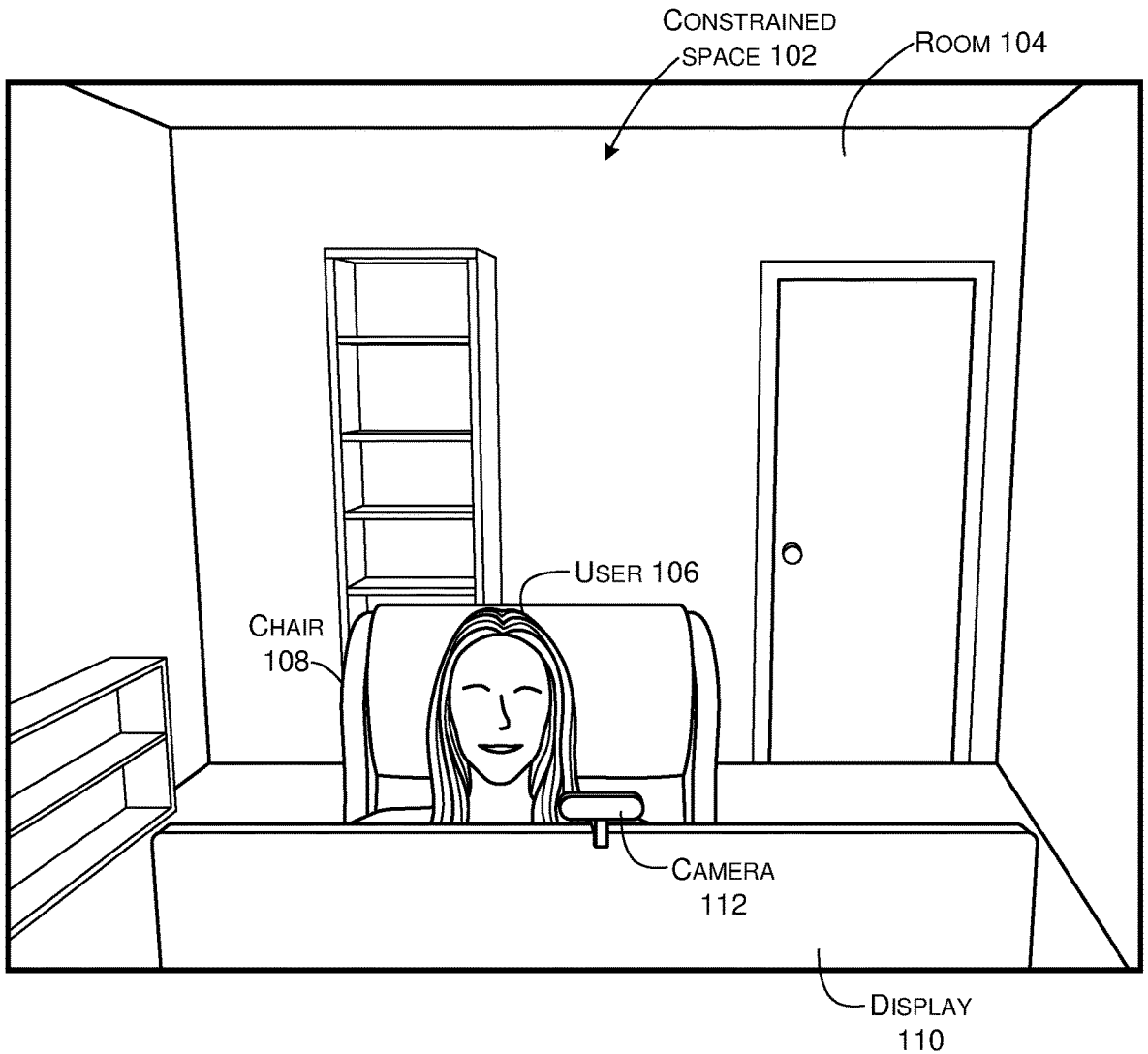
FIGS. 1-6 show example scenarios to which some of the present camera calibration concepts can be applied.

FIG. 1 shows an example scenario 100 where the present concepts can be employed. This scenario 100 can involve a constrained space 102, such as room 104 manifest as a home office. A user 106 is seated on a chair 108 facing a display 110 and a camera 112. Constraints, such as the dimensions of the room and/or obstacles, such as chair 108 can inhibit or otherwise interfere with the user's ability to walk around the room. Further, the dimensions of the room and/or the obstacles can inhibit the range of distances that the user can stand and be captured by the camera. Further still, the dimensions of the room and/or the obstacles can inhibit the camera capturing full body (e.g., head to toe) images of the user. Some of the present concepts can offer a technical solution to these problems by achieving camera calibration based upon partial body images of the user (e.g., without capturing full-body head-to-toe images of the user).

Figure 2A:
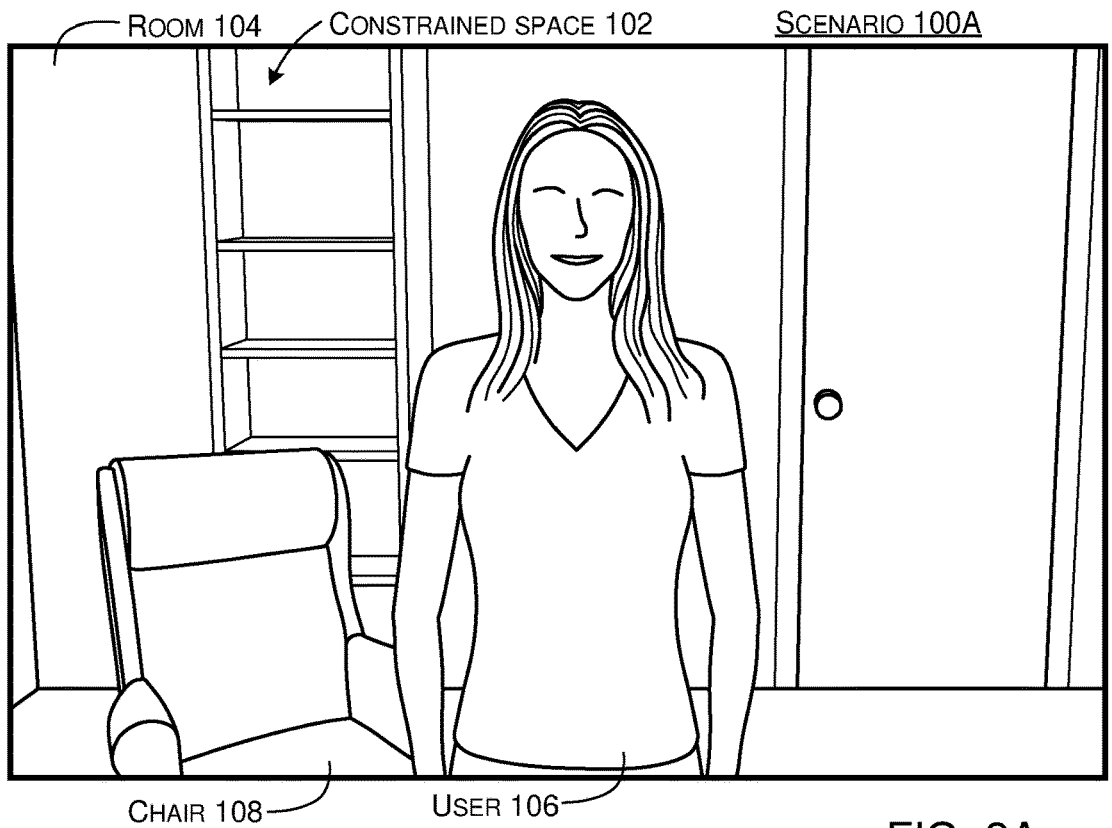
Figure 2B:
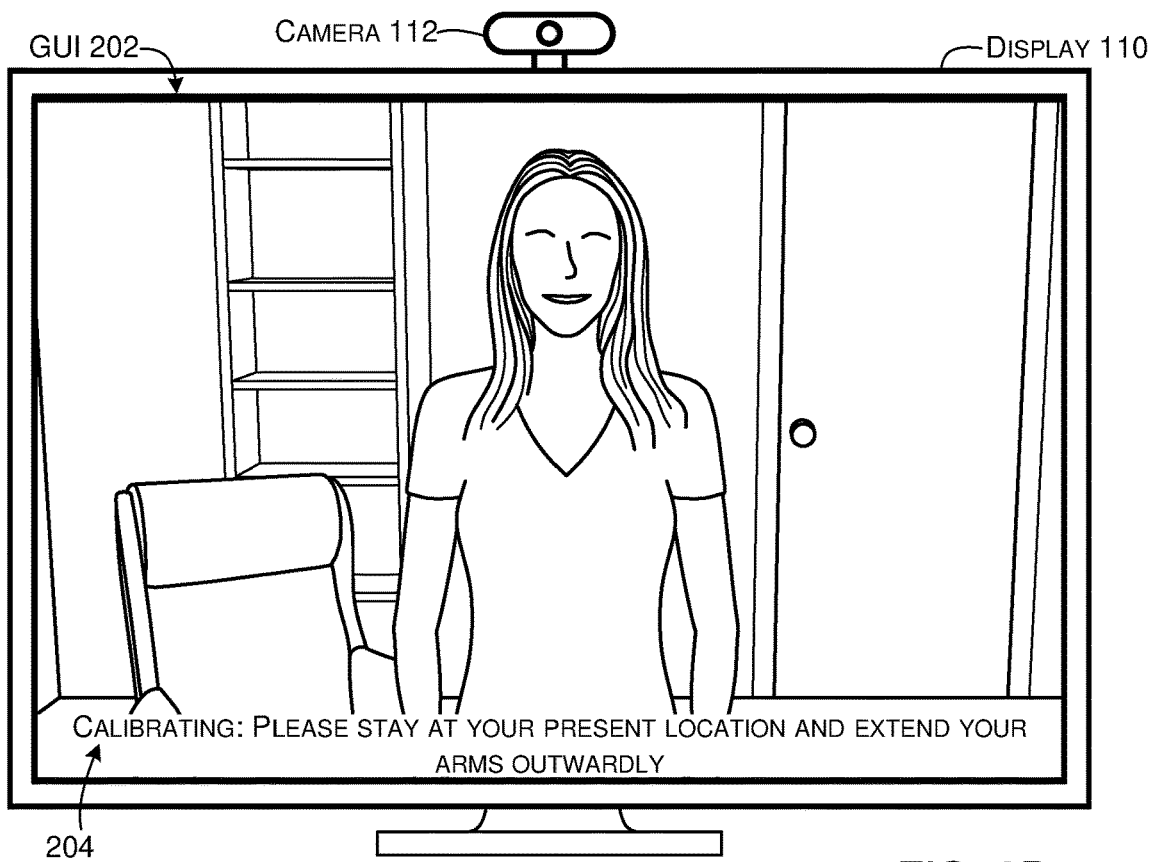
Figure 2C:
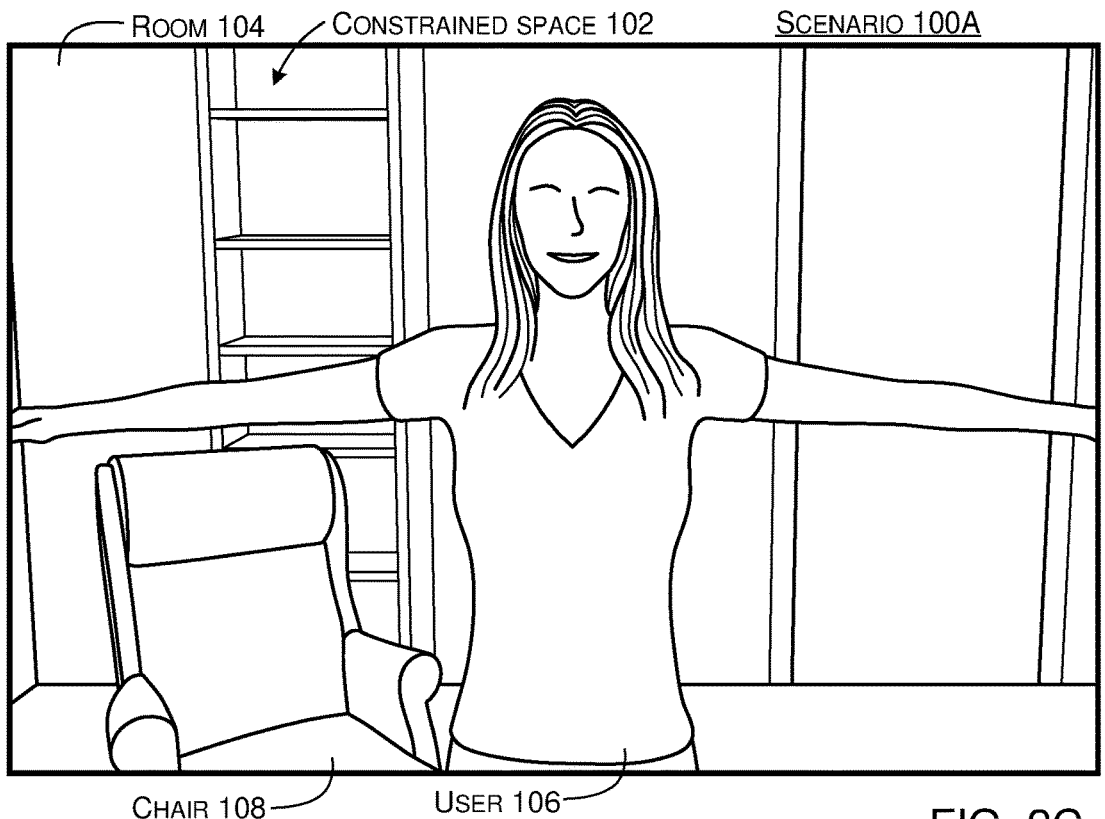
Figure 2D:
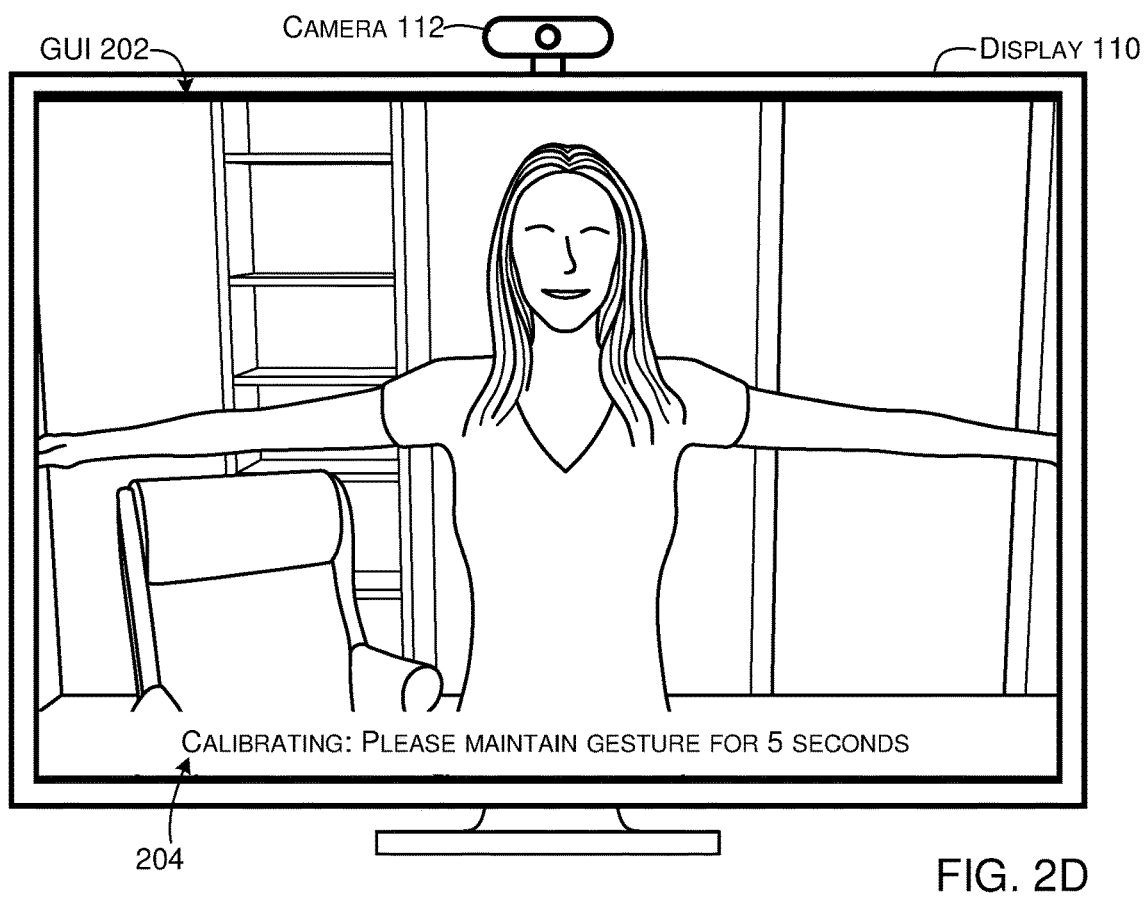
Figure 2E:
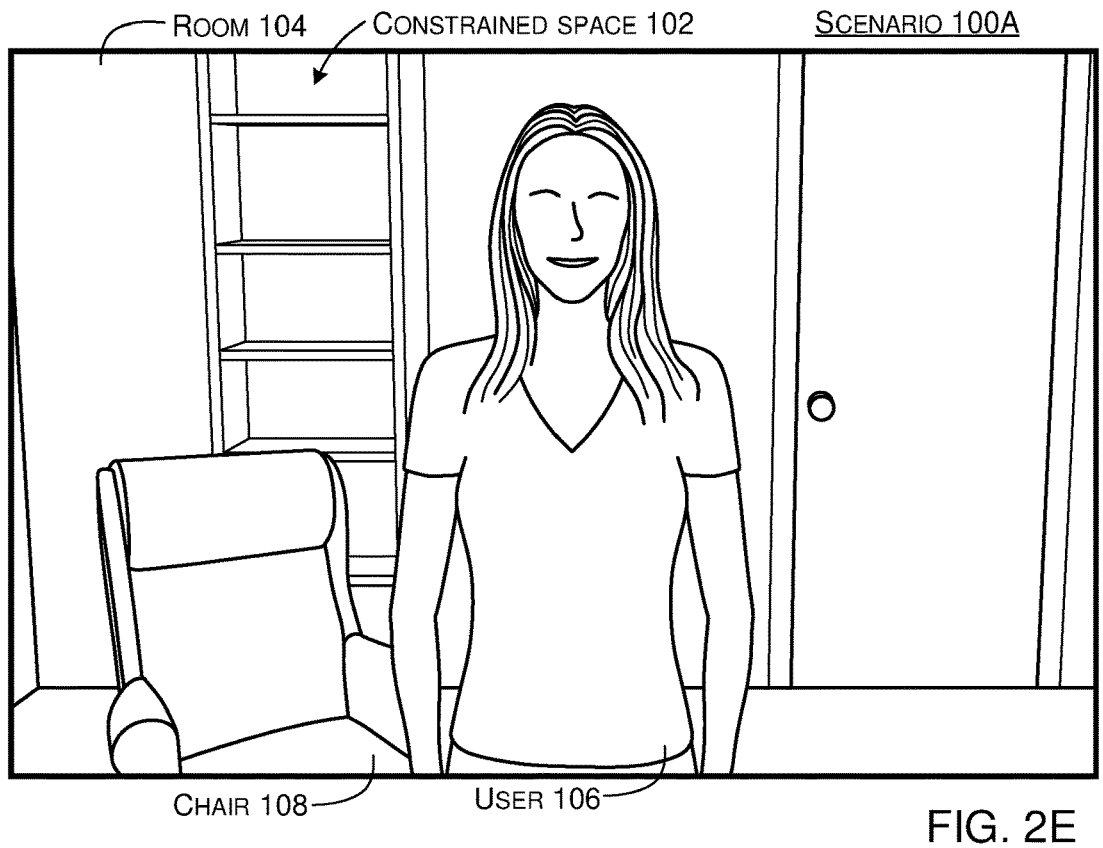
Figure 2F:
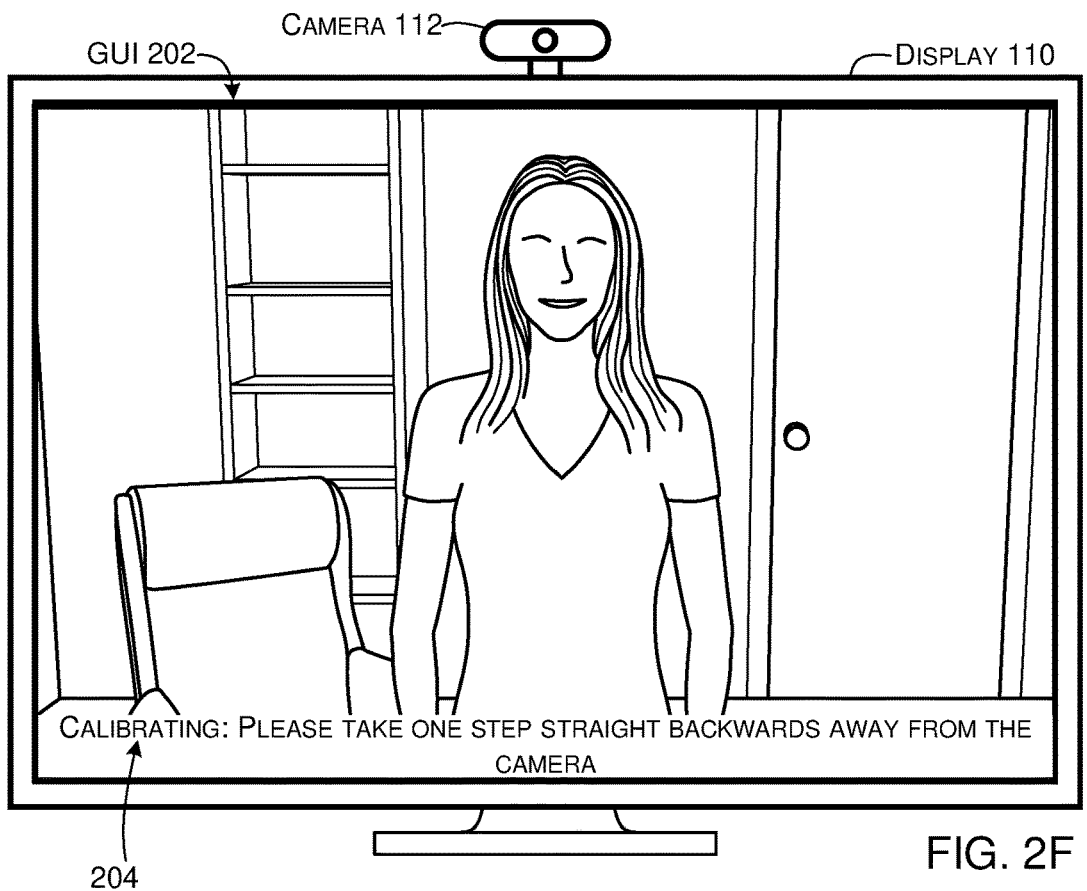
Figure 2G:
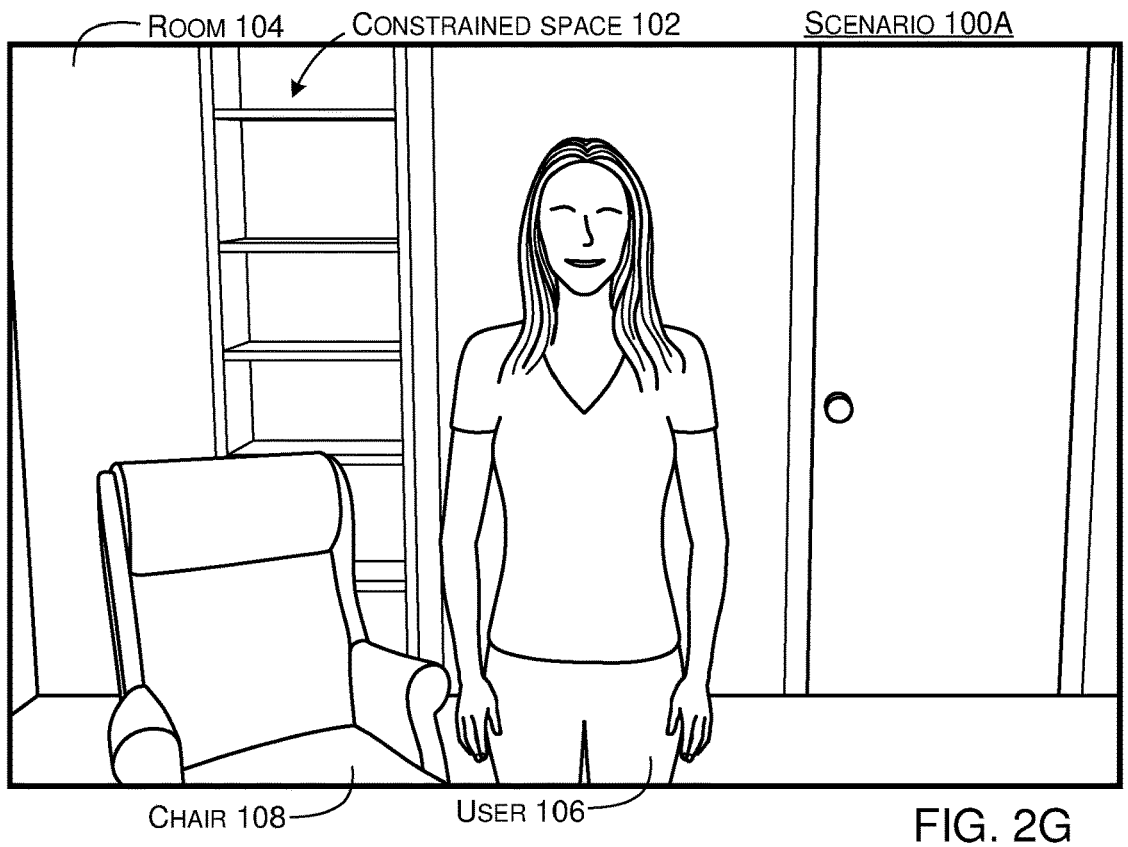
Figure 2H:
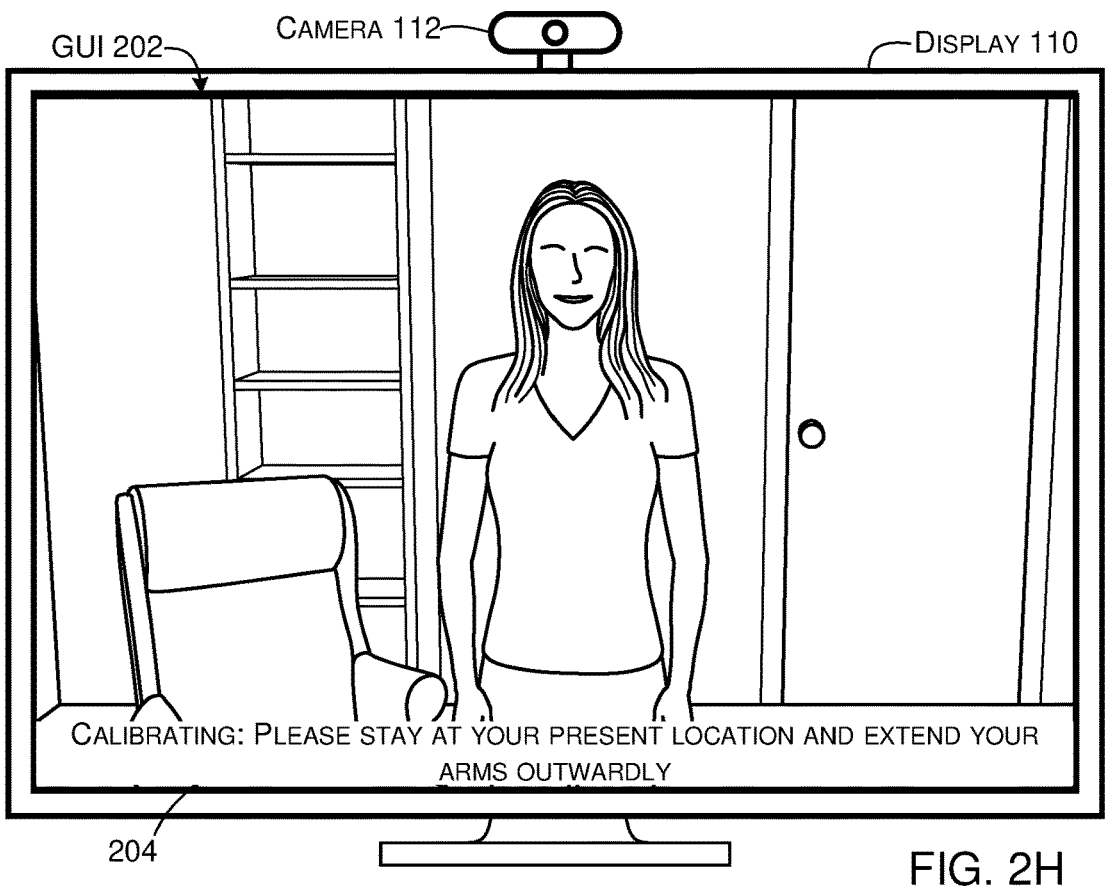
Figure 2I:
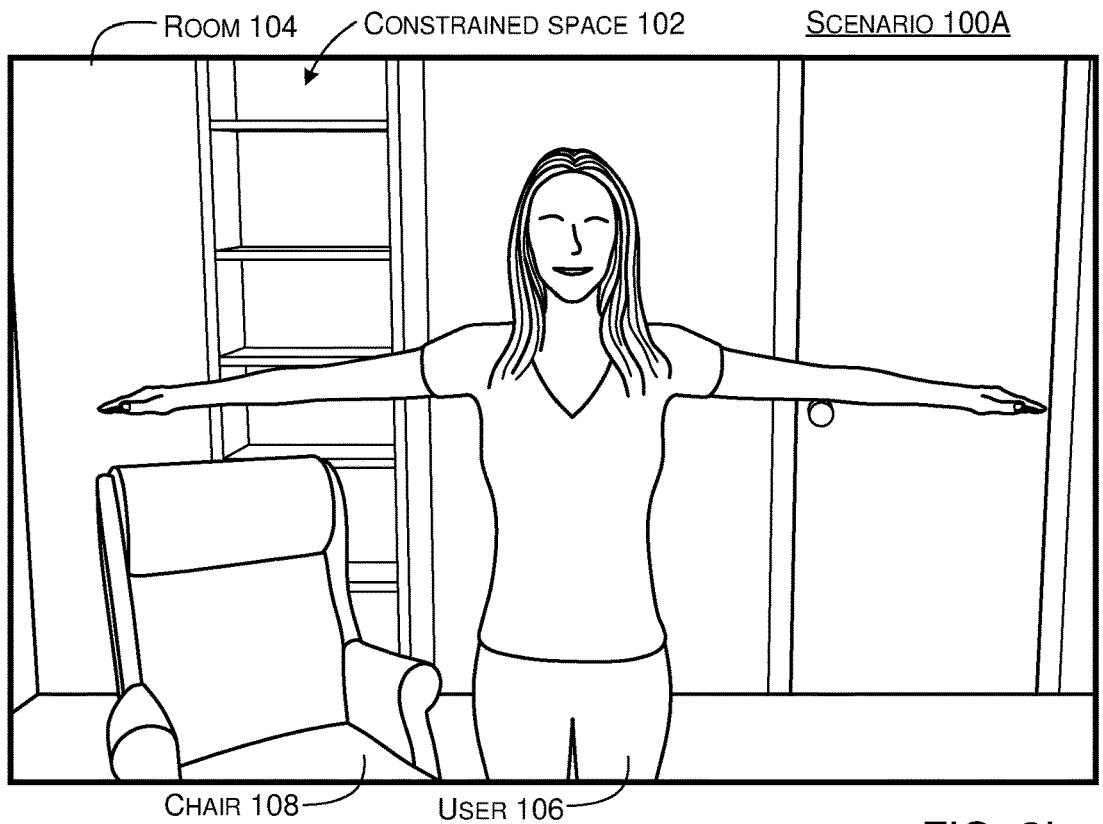
Figure 2J:
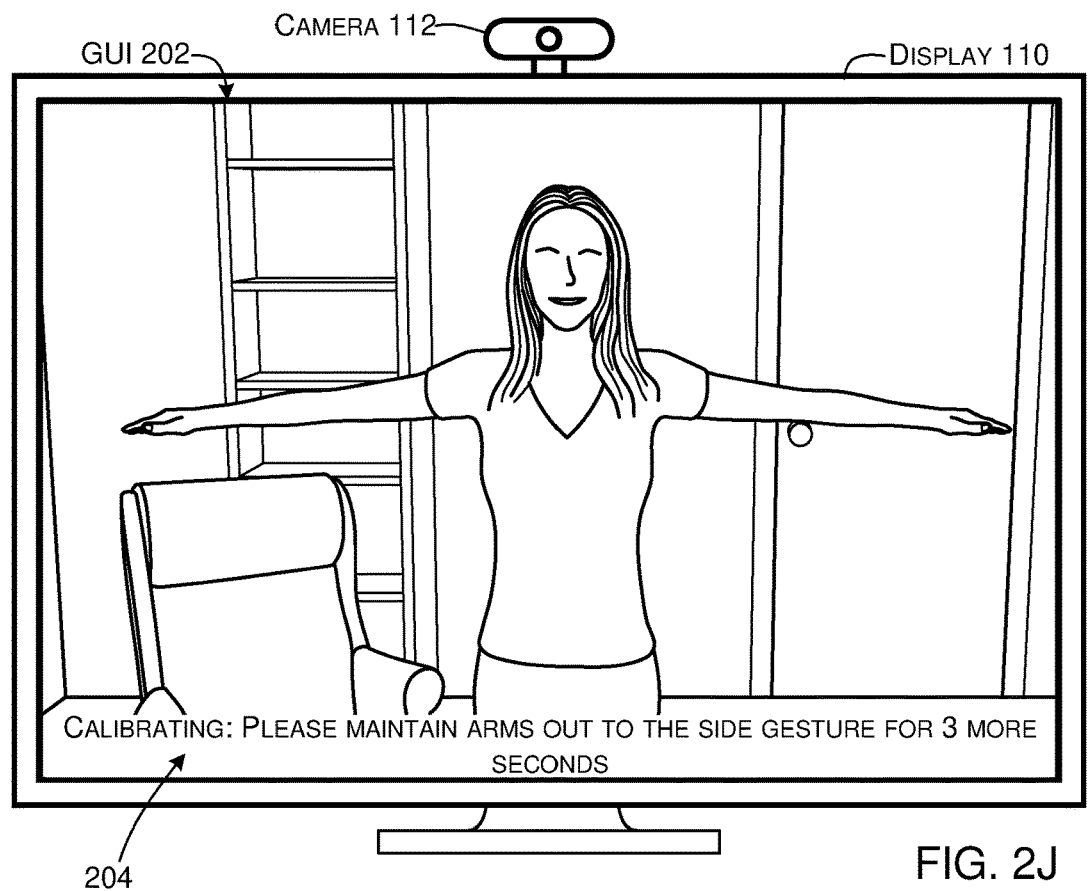
Figure 2K:
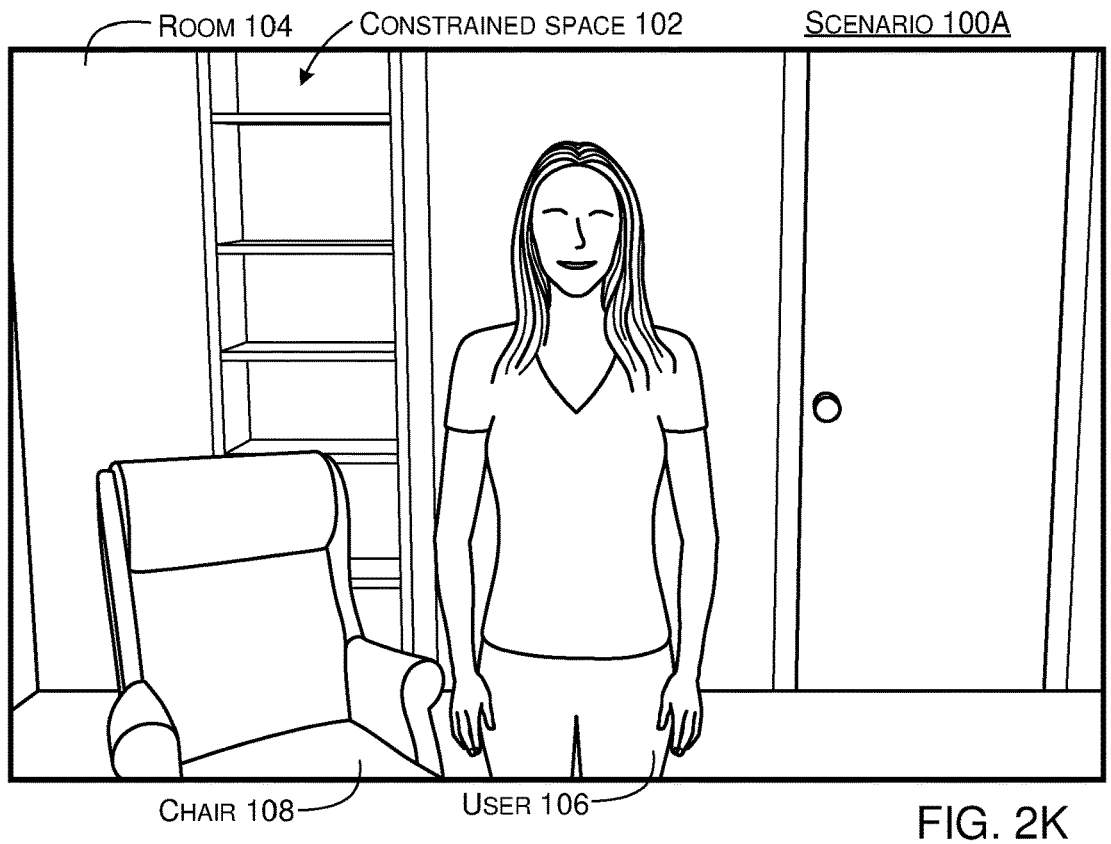
Figure 2L:
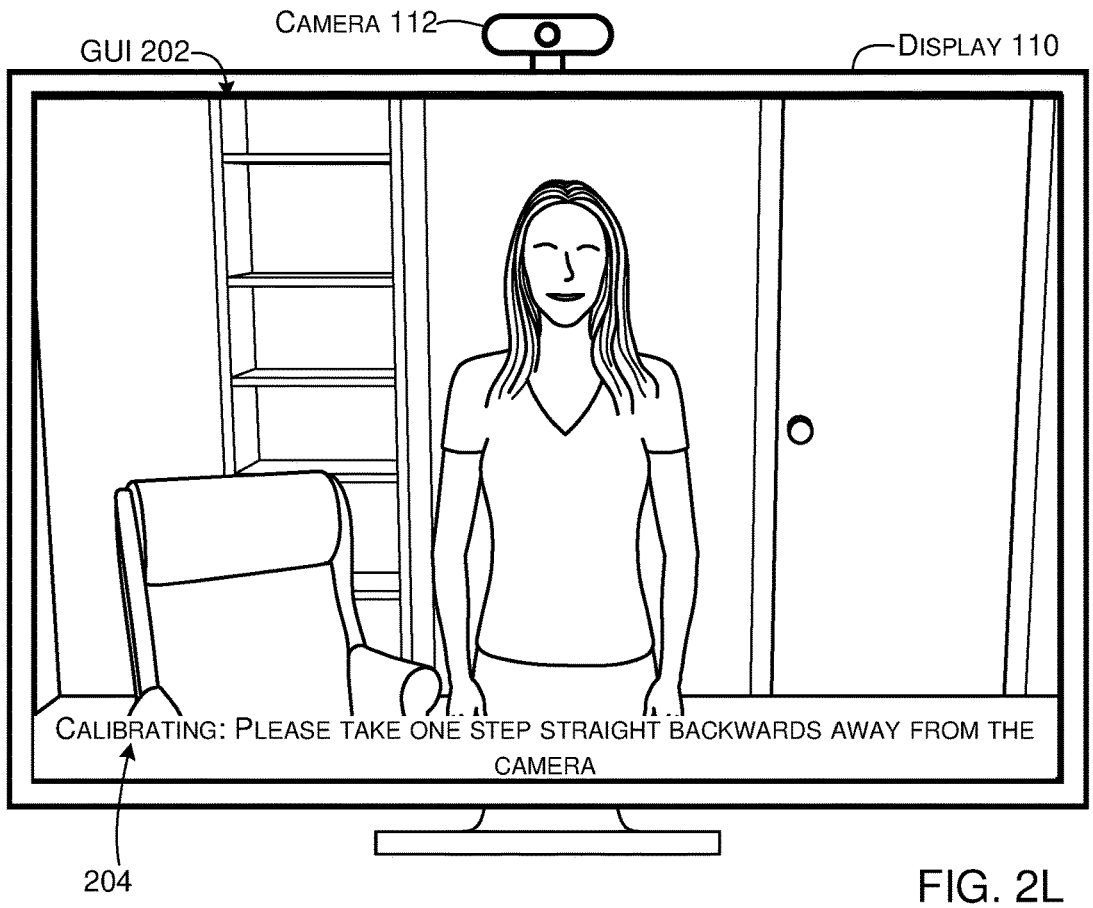
Figure 2M:
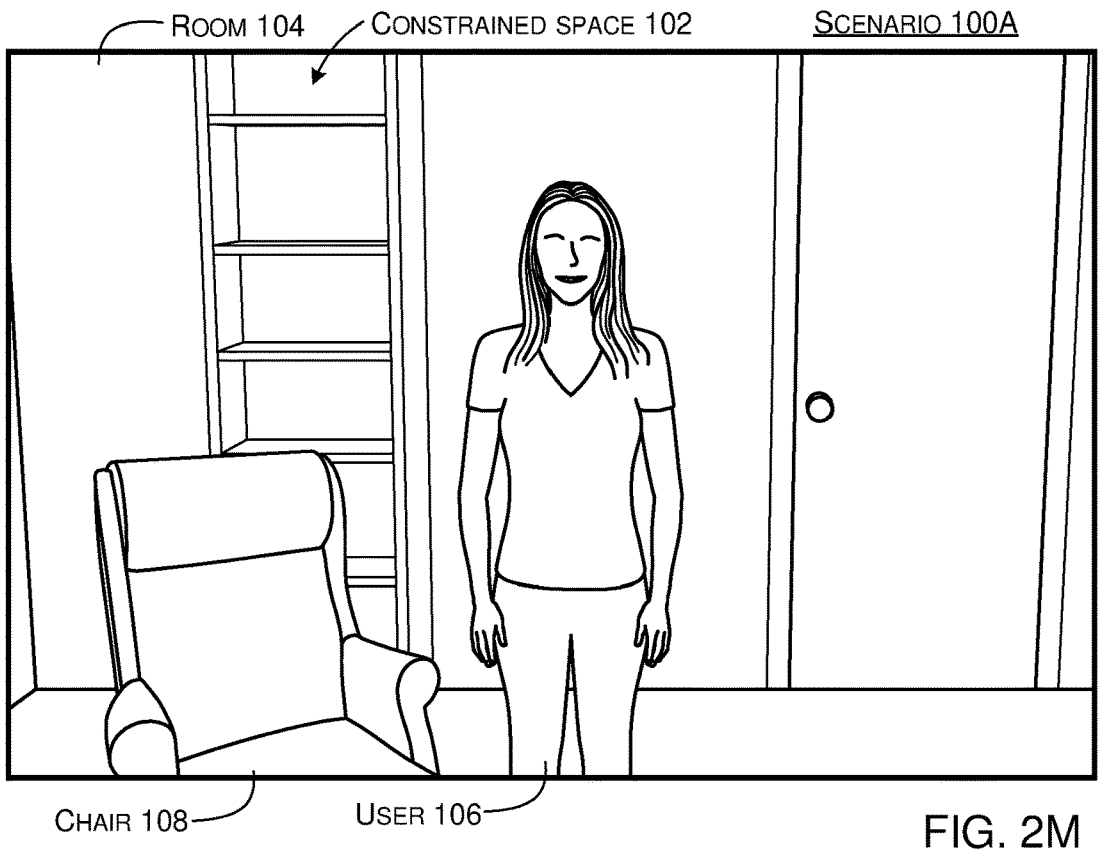
Figure 2N:
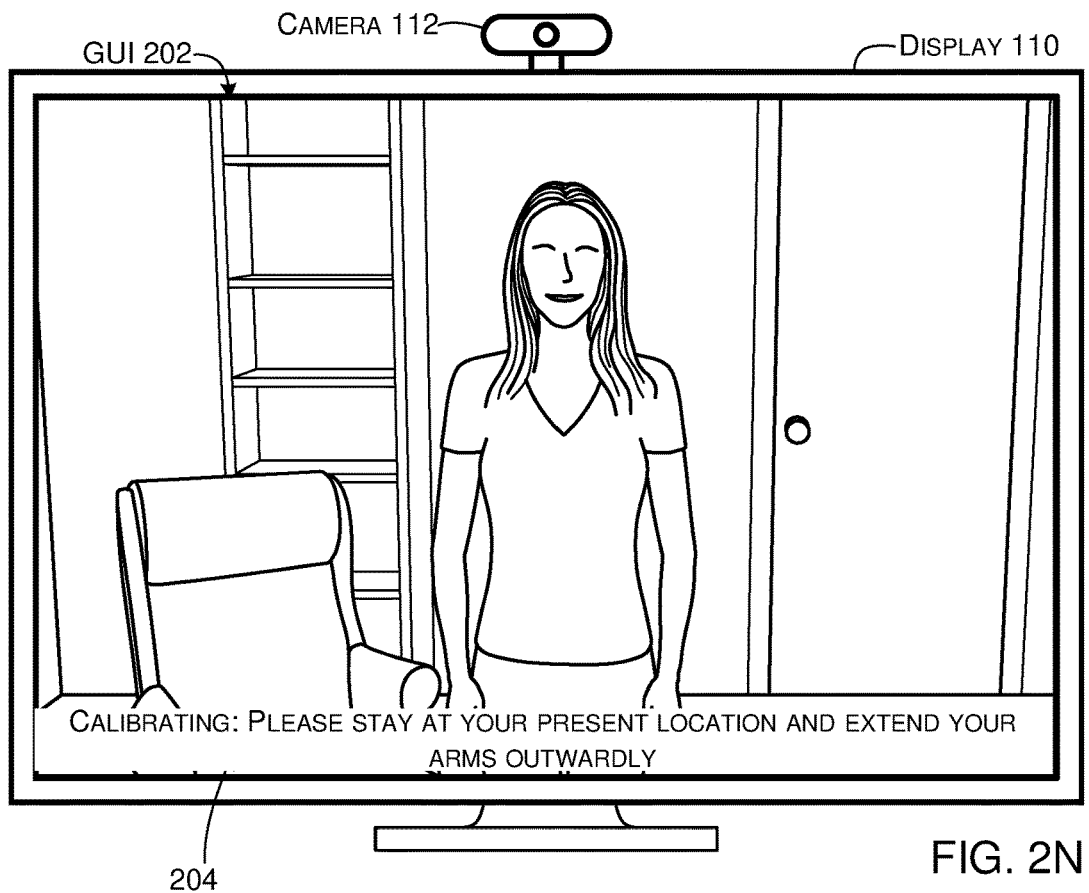
Figure 2O:
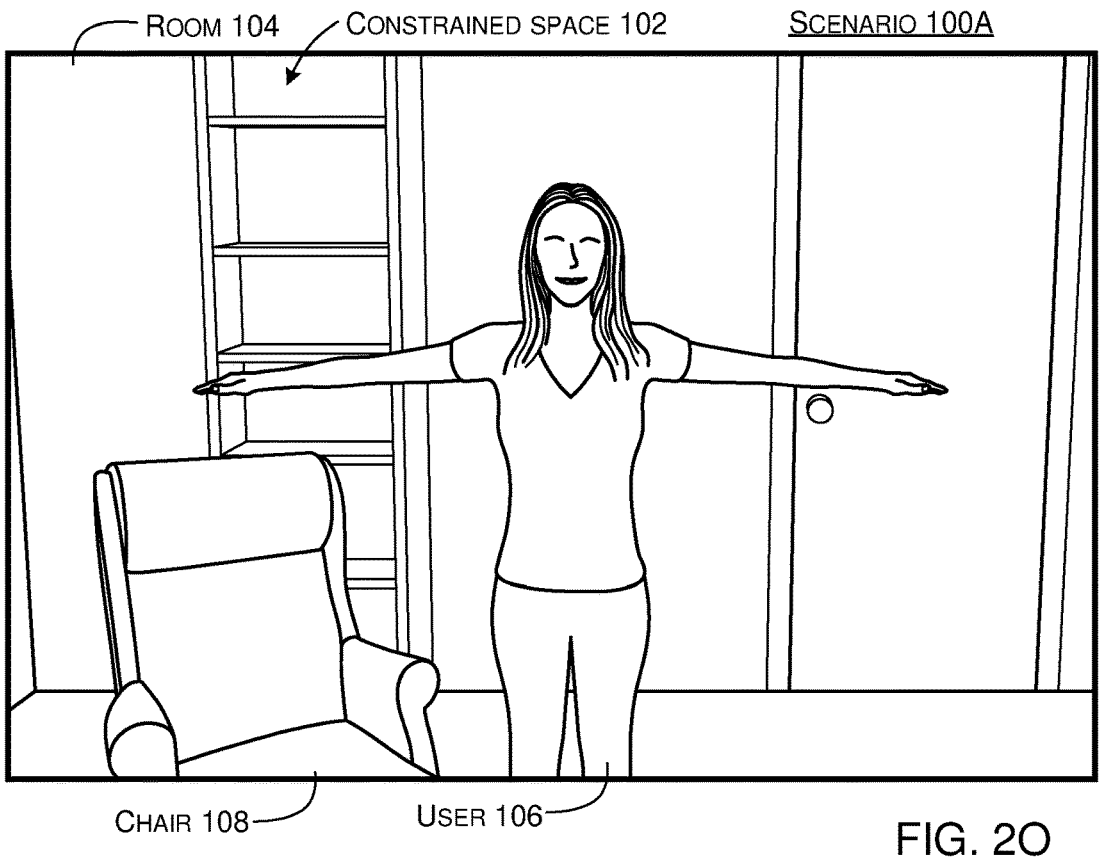
Figure 2P:
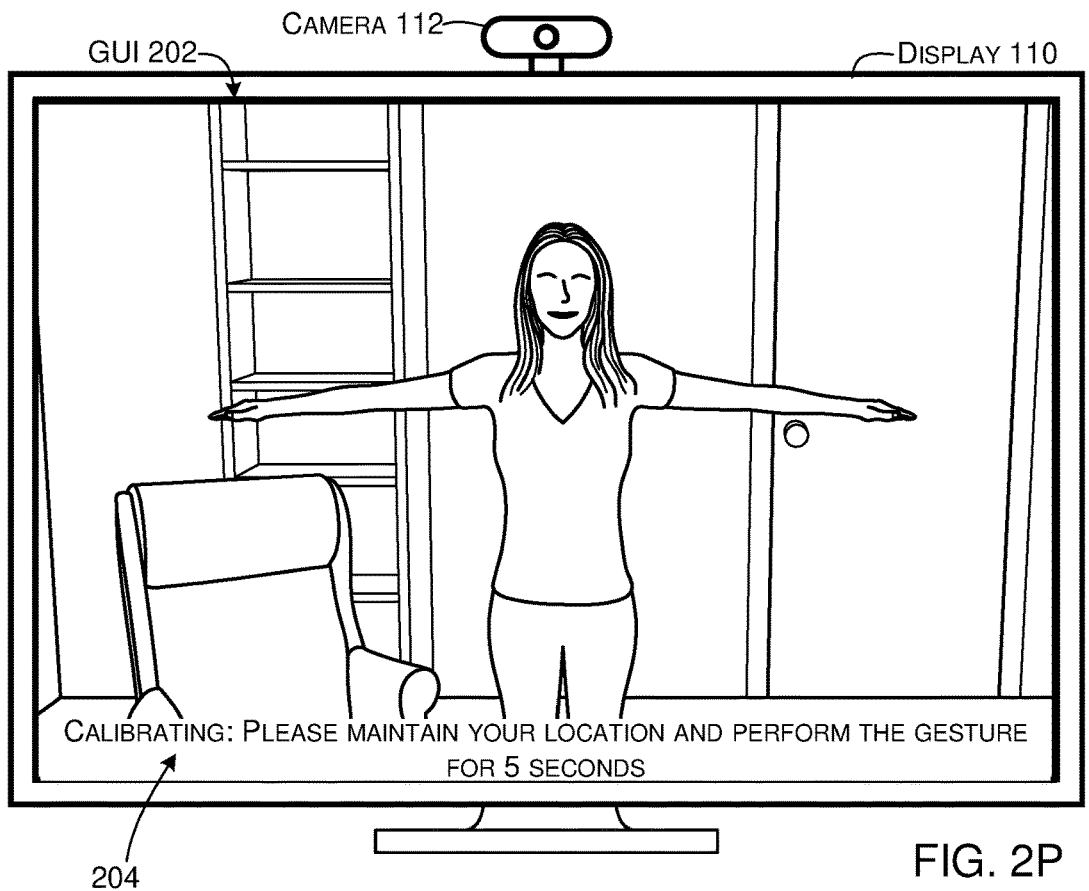
Figure 2Q:
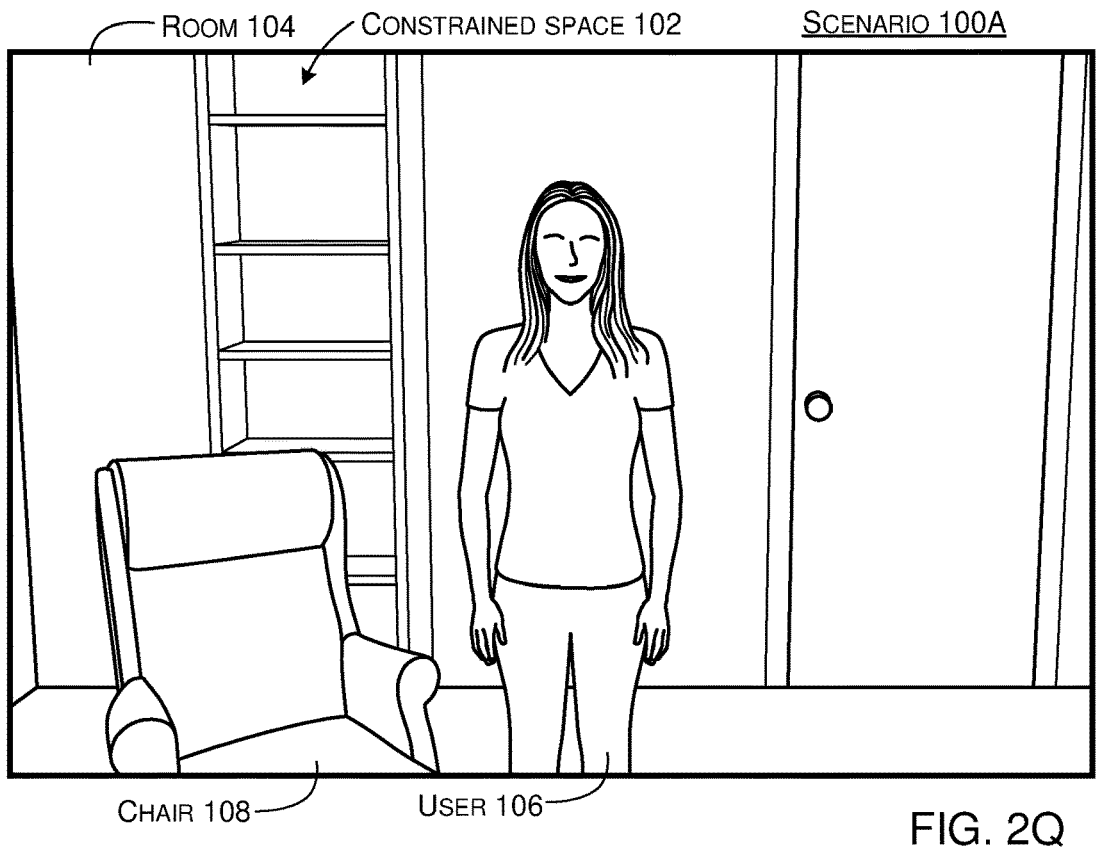
Figure 2R:
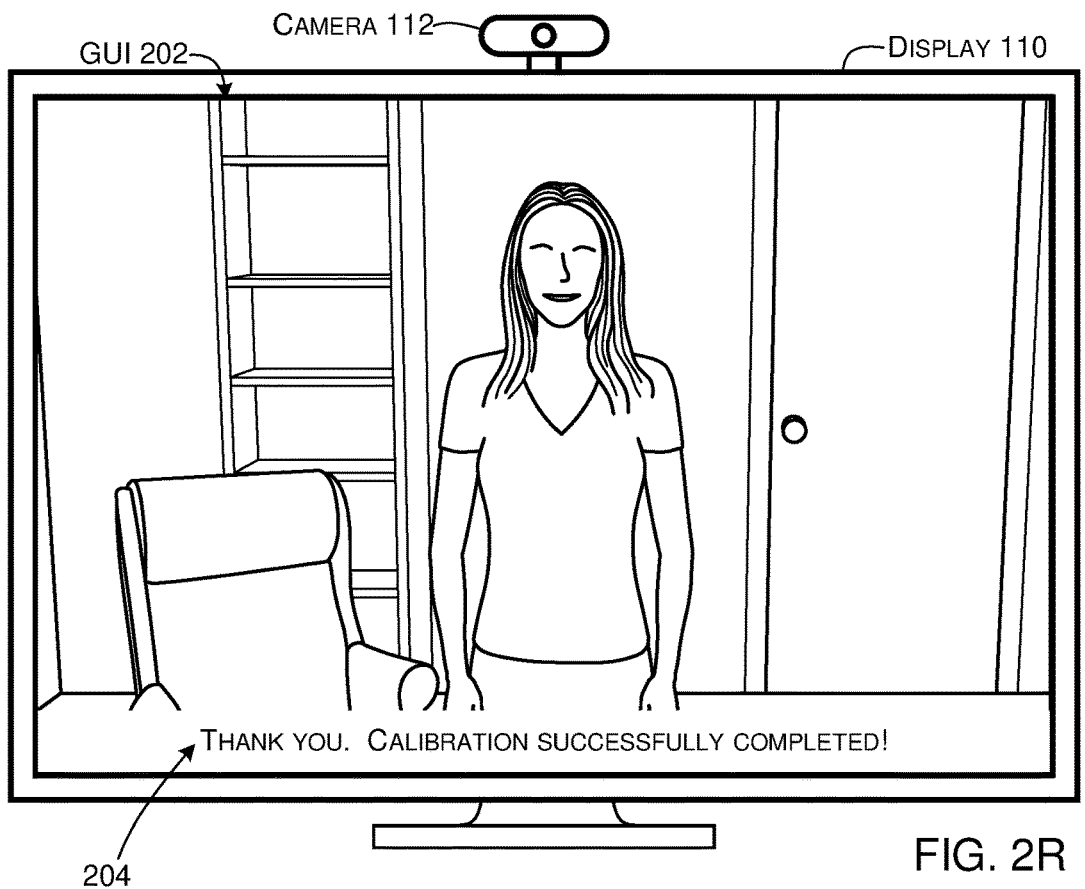

FIGS. 2A-2R collectively show an example implementation scenario 100A of some of the present calibration concepts. Each of these drawing pages offers a pair of complementary figures. For instance, FIG. 2A shows an image of room 104 captured by camera 112.

Complementary FIG. 2B shows a graphical user interface (GUI) 202 presented on display 110 to the user 106. In this implementation, the user is given instructions so that the camera can image at least an upper body of the user at a first location, cause the user to move back a step to a second location and then the camera can image the user's upper body again. This information can be utilized to derive other calibration information so that camera calibration can be accomplished.

Starting at FIGS. 2A and 2B, in this implementation, GUI 202 includes the image of the user captured by the camera 112 as well as other information, such as instructions 204 to facilitate the calibration process. In this case, the instructions 204 indicate that calibration is ongoing and request the user to please stay at your present location and extend arms outwardly. Thus, the GUI 202 allows the user to see what the camera sees (e.g., what the camera is imaging) as well as providing instructions 204 to the user to facilitate the calibration process. The 'arms out' can be an example calibration gesture that can be recognized by the camera or another device. The calibration gesture can be utilized to control the calibration process so that one or more images of the user are captured while the user is performing the gesture at the location. The present implementation utilizes the 'arms out' gesture, but other gestures can be utilized and other example gestures are described below relative to FIGS. 3A-3N. Note also, though not shown, the calibration process could start with the user in the seated position, such as FIG. 1, and provide the user with instructions to get to the scenario shown starting at FIG. 2A.

FIGS. 2C and 2D show the user responsively holding her arms straight out to the side. The GUI's instructions 204 tell the user to maintain your location and gesture for 5 seconds. During this period, the calibration process can capture one or more images of the user. The images can include at least the upper body of the user. For example, in this case, the user's legs are outside of the field of view of the camera and thus are not included in the images.

FIGS. 2E and 2F show a subsequent point where the GUI instructions 204 request the user to please take one step straight backwards away from the camera. Thus, the instructions are intended to cause the user to take one step backward from the location to a second location and the direction of the step is straight away from the camera (e.g., perpendicular to the display 110).

FIGS. 2G and 2H show a subsequent point where the user has taken a step back. The instructions 204 now request the user to please stay at your present location and extend your arms outwardly. This aspect is similar to FIGS. 2A and 2B, but with the user at a second location that is a step further away from the camera relative to the first location of FIGS. 2A and 2B.

FIGS. 2I and 2J show a subsequent point with the user maintaining the 'arms out' to the side gesture as requested by the instructions 204. Similar to FIGS. 2C and 2D, the gesture can be detected and utilized as a trigger to capture one or more images of the user. In this case, the user is at the second location rather than the first location of FIGS. 2C and 2D. The time that the user is requested to maintain the gesture can be dynamically updated as images are captured (e.g., the user can be notified when sufficient images have been captured of the user performing the calibration gesture at the location).

FIGS. 2K and 2L shows a subsequent point where the calibration image or images have been obtained at this second location and the instructions 204 request that the user please take one step straight backwards away from the camera. FIGS. 2K and 2L are similar to FIGS. 2E and 2F except that the user is now at the second location rather than the first location.

FIGS. 2M and 2N show the user after taking the step back requested in FIGS. 2K and 2L. At this point the instructions 204 on the GUI 202 request the user to please stay at your present location and extend your arms outwardly in the 'arms out' calibration gesture.

FIGS. 2O and 2P show the user performing the arms out gesture requested in FIGS. 2M and 2N. The instructions 204 request the user to please maintain your location and perform the gesture for five seconds. During this time one or more images can capture the user at this location.

FIGS. 2Q and 2R show a subsequent point where the user is notified via instructions 204 that the calibration process has been successfully completed. The calibration process allowed images to be captured (of at least part of the user) at multiple locations, in this case, three locations. The user calibration gestures, in this case the both arms extended out calibration gesture serves as a confirmation that the user is at the location and is stationary. This information (e.g., these calibration parameters) can be utilized to derive other calibration parameters that are not otherwise directly available. The calibration can be achieved with the combination of these calibration parameters. An example process for calibrating the camera with the calibration parameters is described below relative to FIG. 6. The calibrated camera can contribute to enhanced functionality. An example of such enhanced functionality is described below relative to FIGS. 5A-5C.

The discussion above explains that camera calibration can be achieved without the camera imaging the user's entire body. At some locations, the camera image may include the user's entire body, but the described camera calibration does not rely on imaging the user's entire body. For instance, at the first location of the user that is closest to the camera, the image may only include the user from the top of the head to the waist. The image at the next farther location may include the top of the head to the knees, and the image of the user at the furthest location may include the entire user from head to toe. The present calibration techniques can be achieved with images of only the upper body, such as from the waist up, though images of more (or all of the body) can be used. Unlike traditional techniques, the present calibration techniques do not rely on full body images of the user. Thus, the present concepts can provide a technical solution that provides camera calibration without the necessity of full body images, which are often unavailable due to distance constraints and/or obstructions.

Figure 3A:
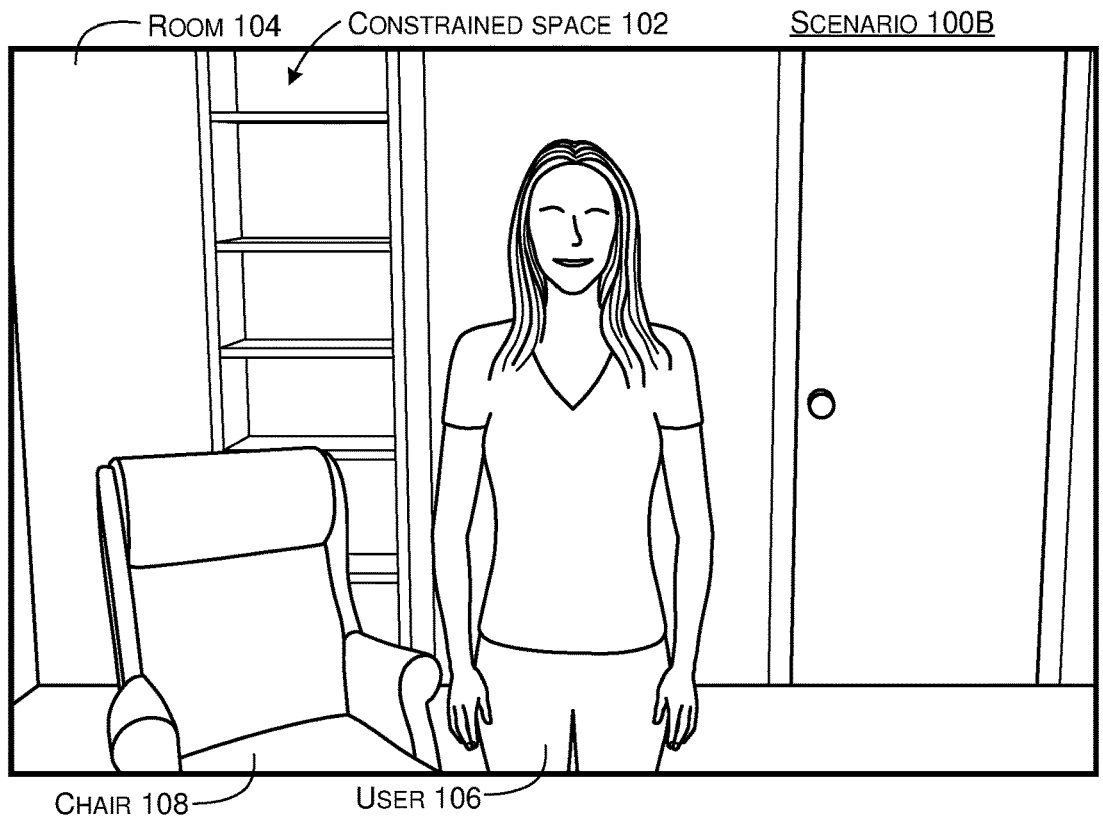
Figure 3B:
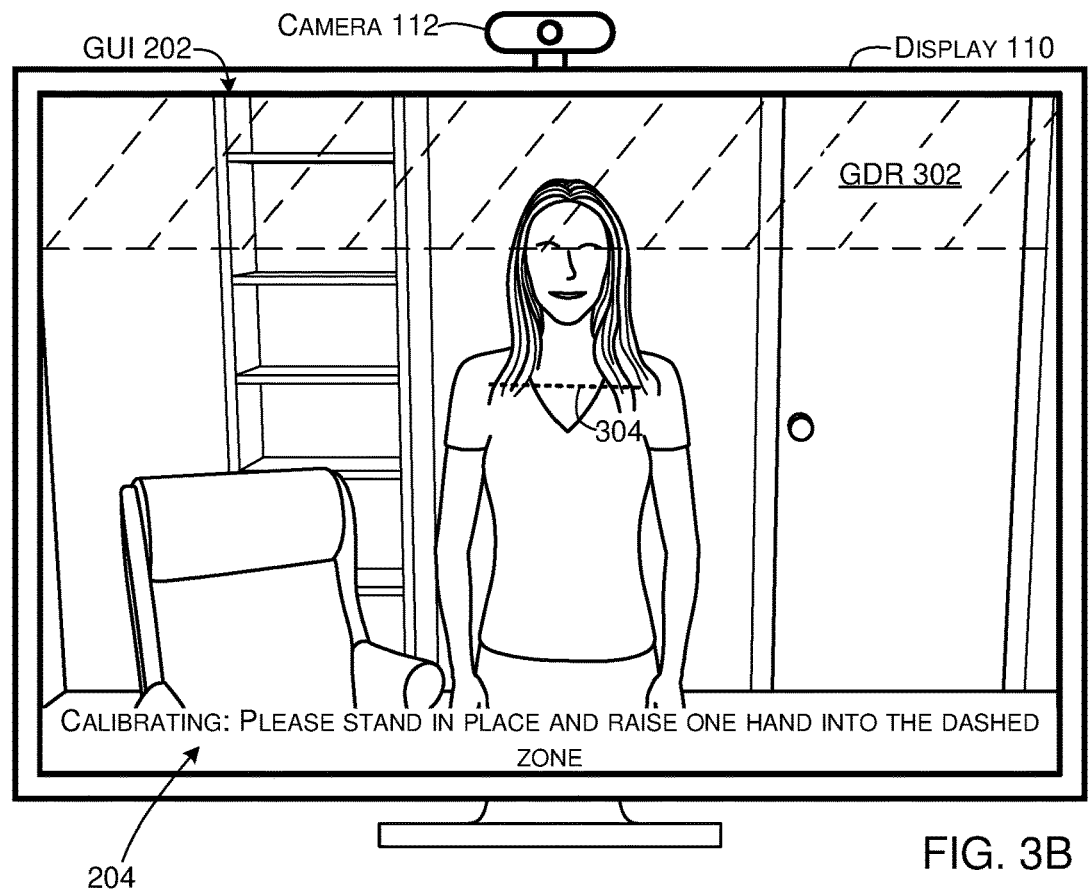
Figure 3C:
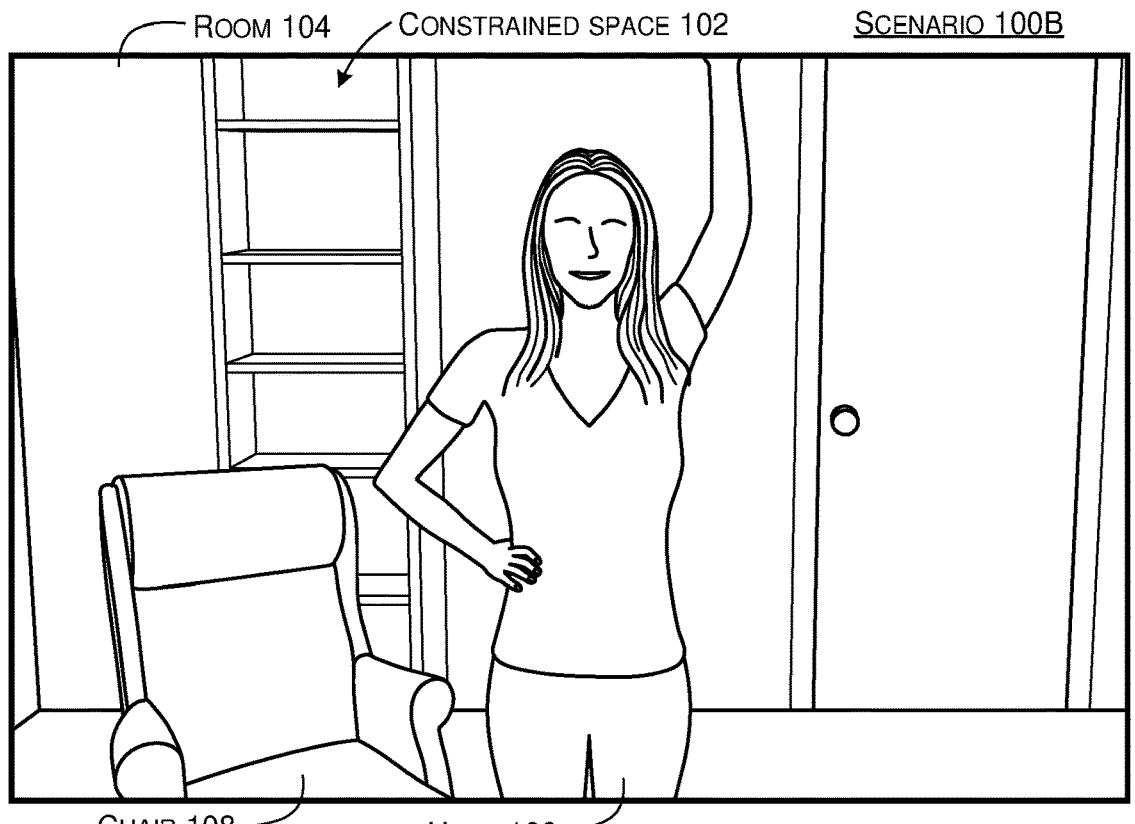
Figure 3D:
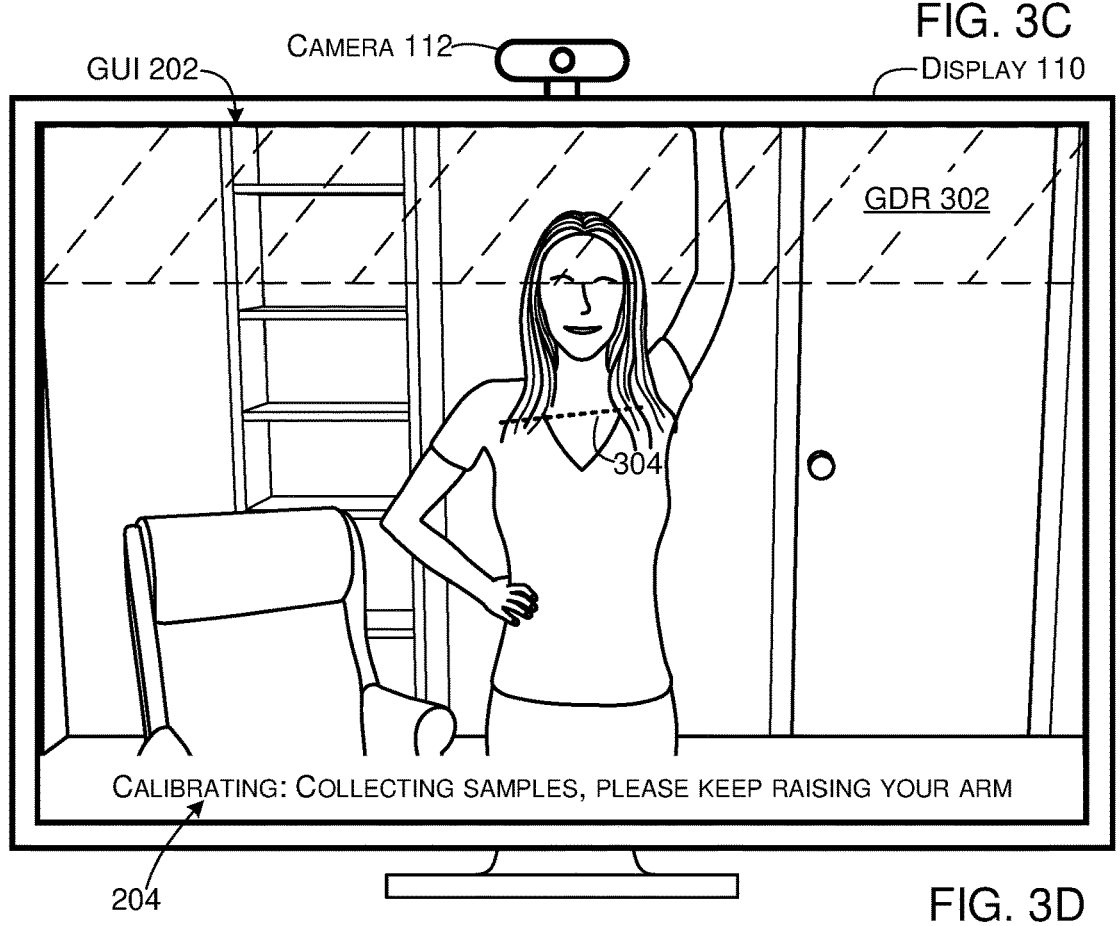
Figure 3E:
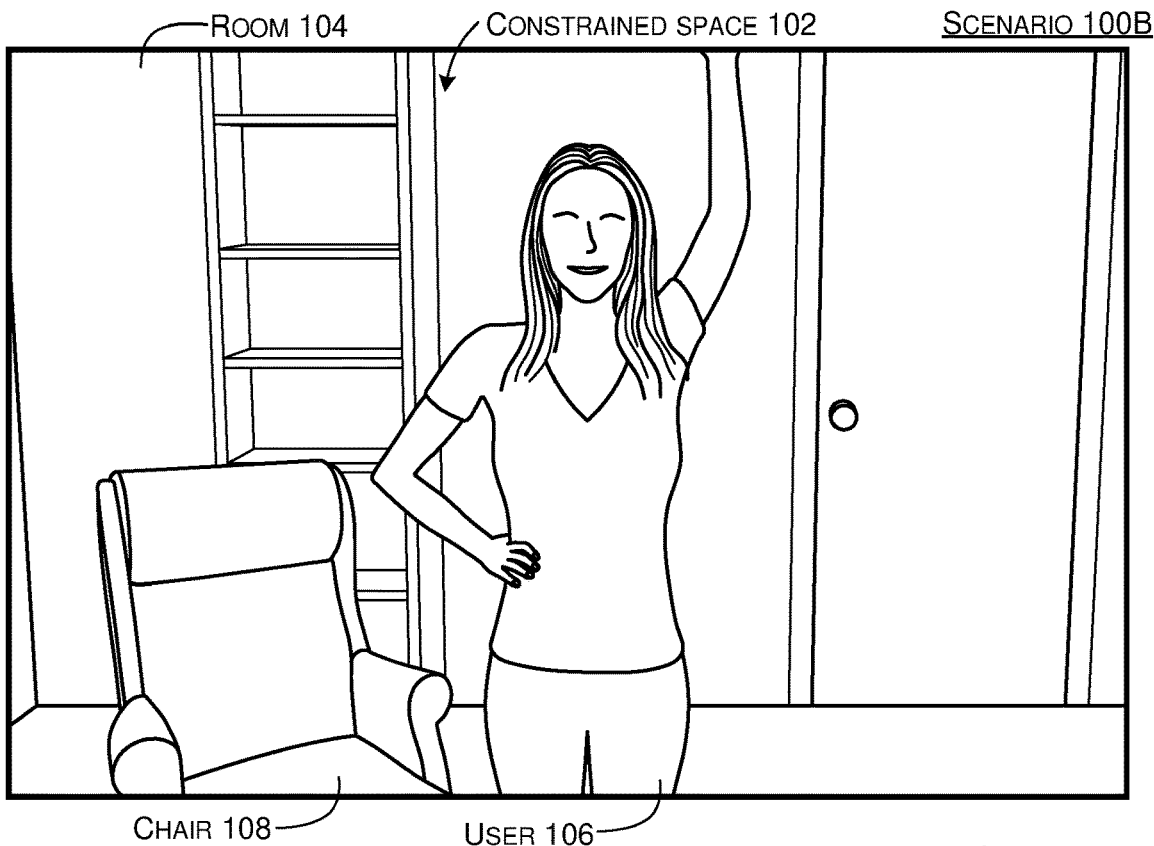
Figure 3F:
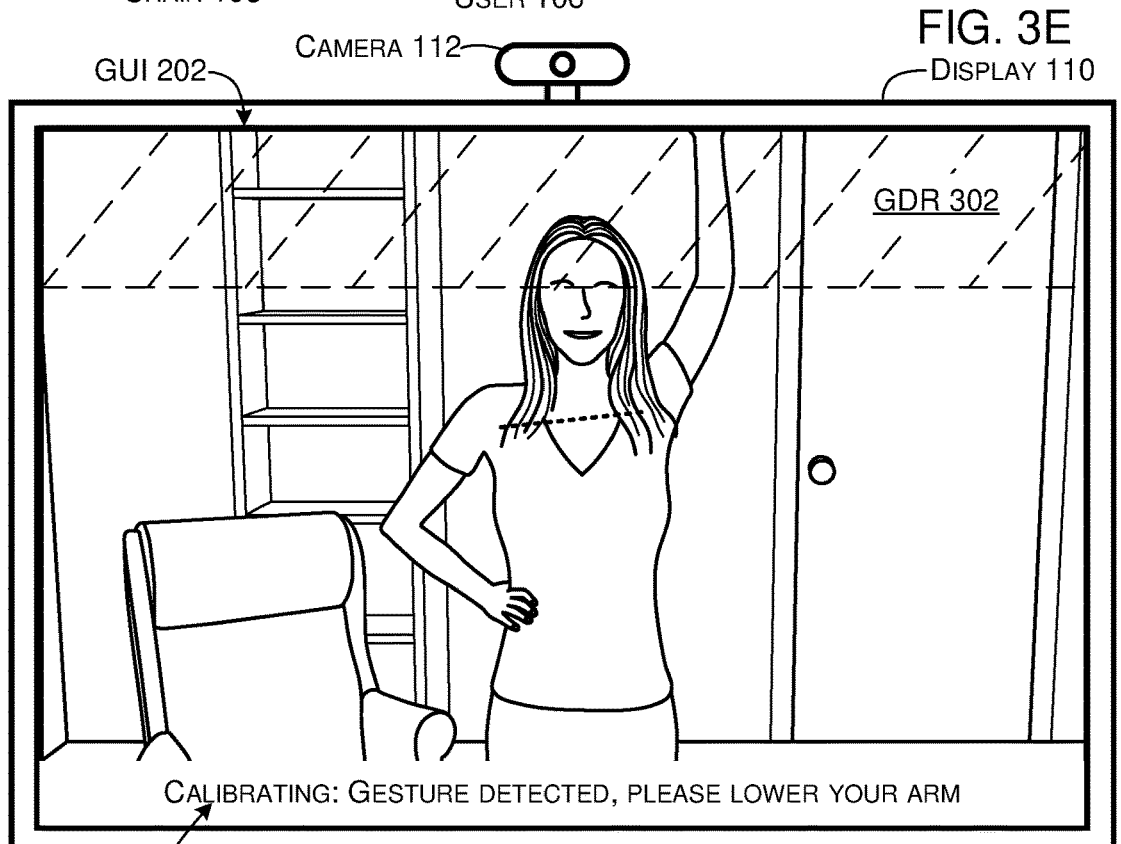
Figure 3G:
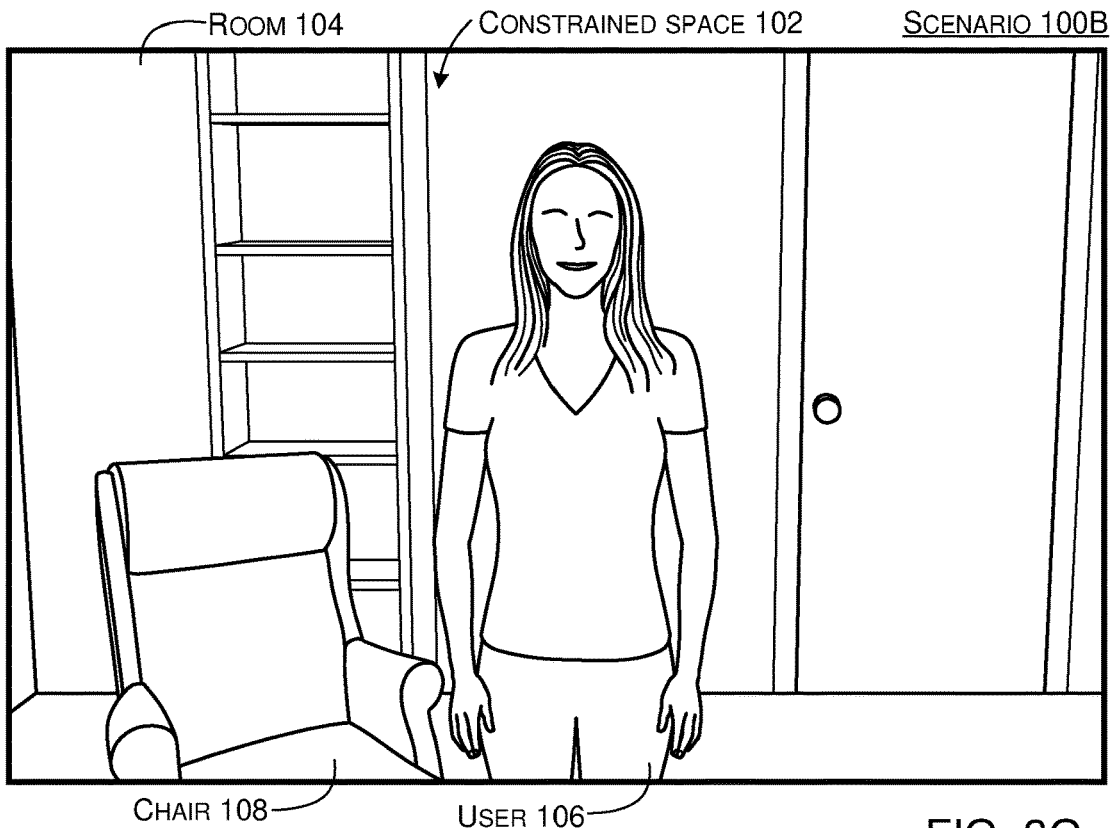
Figure 3H:
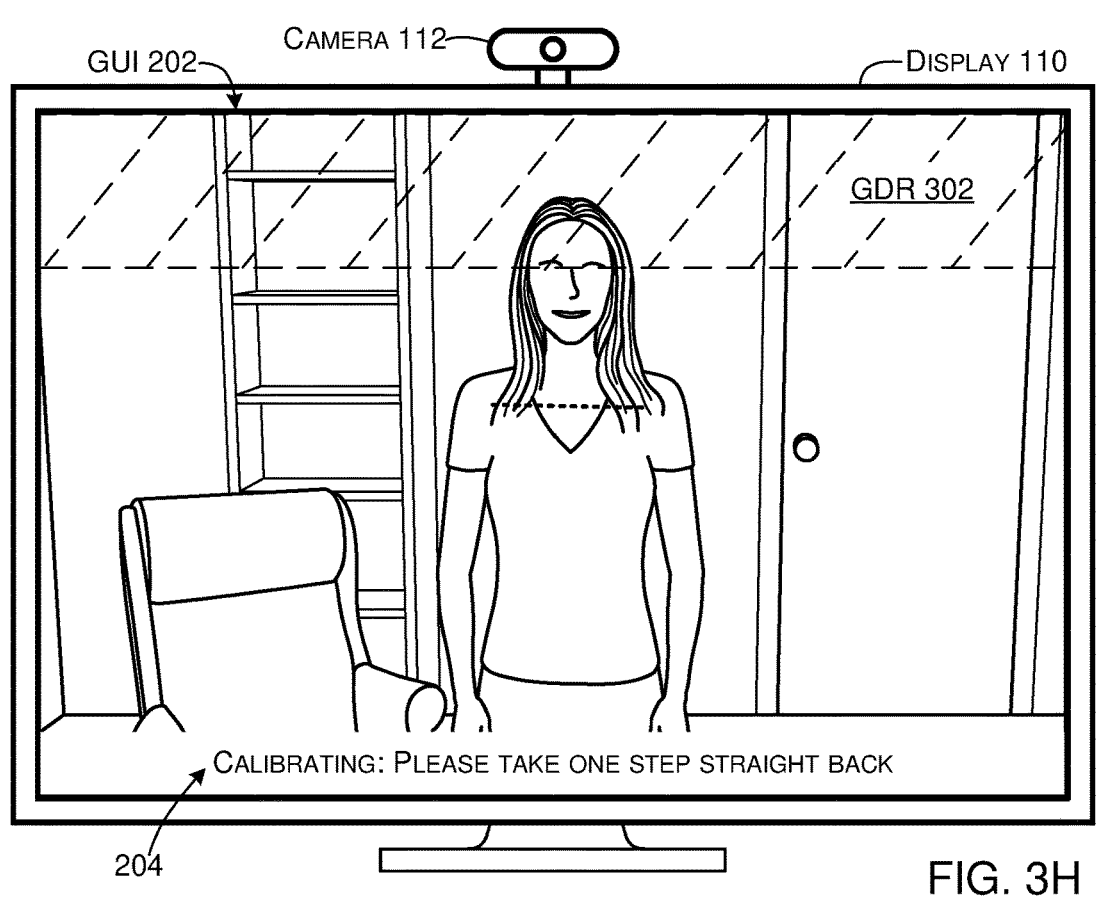
Figure 3I:
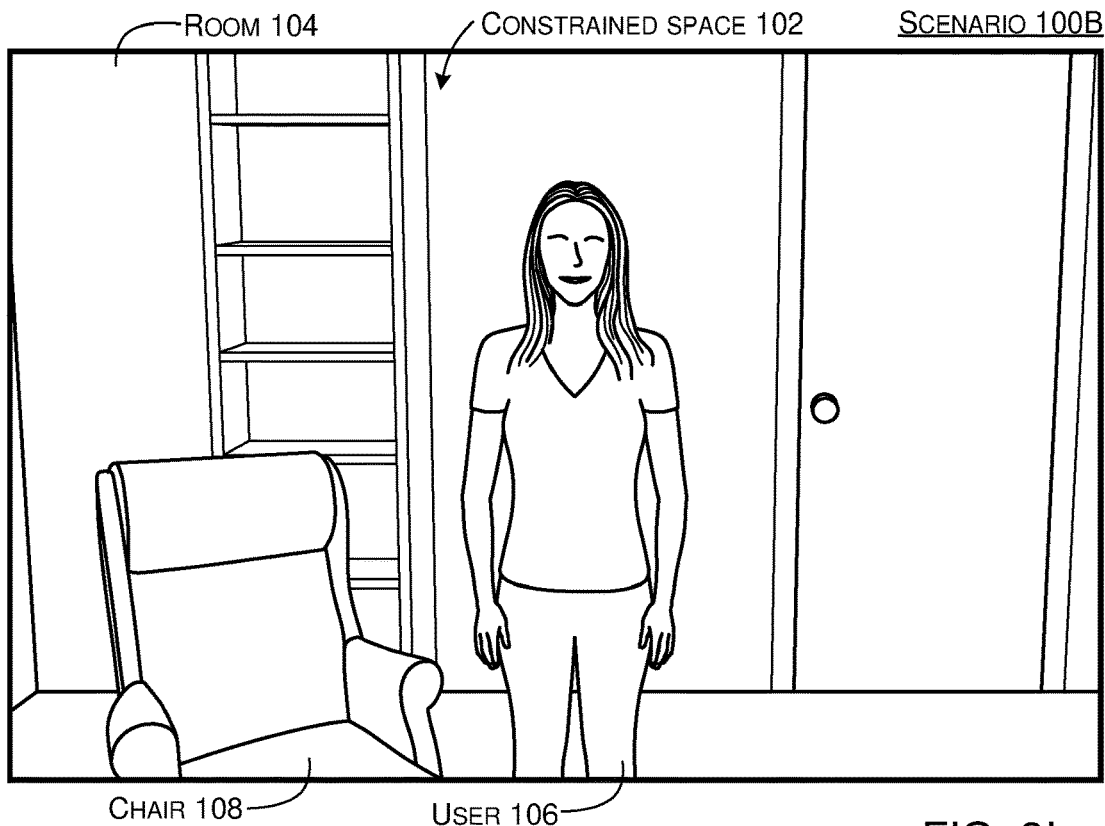
Figure 3J:
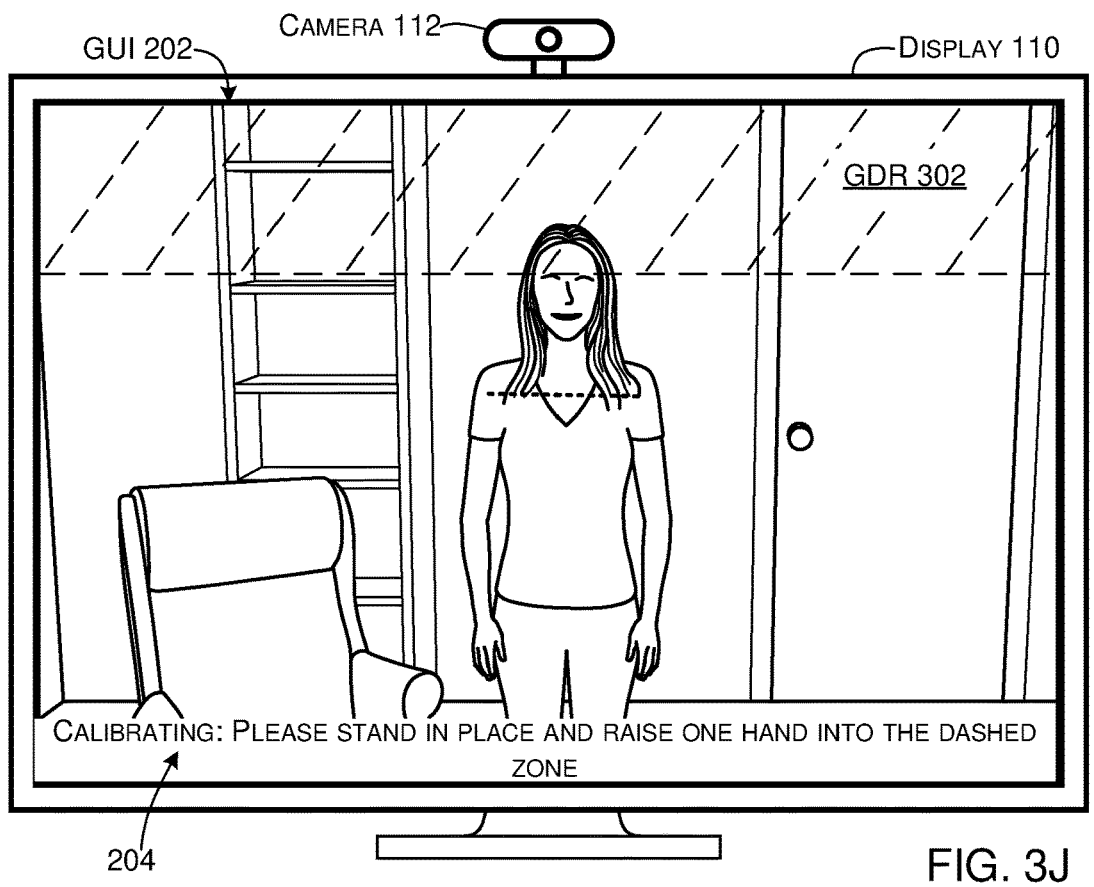
Figure 3K:
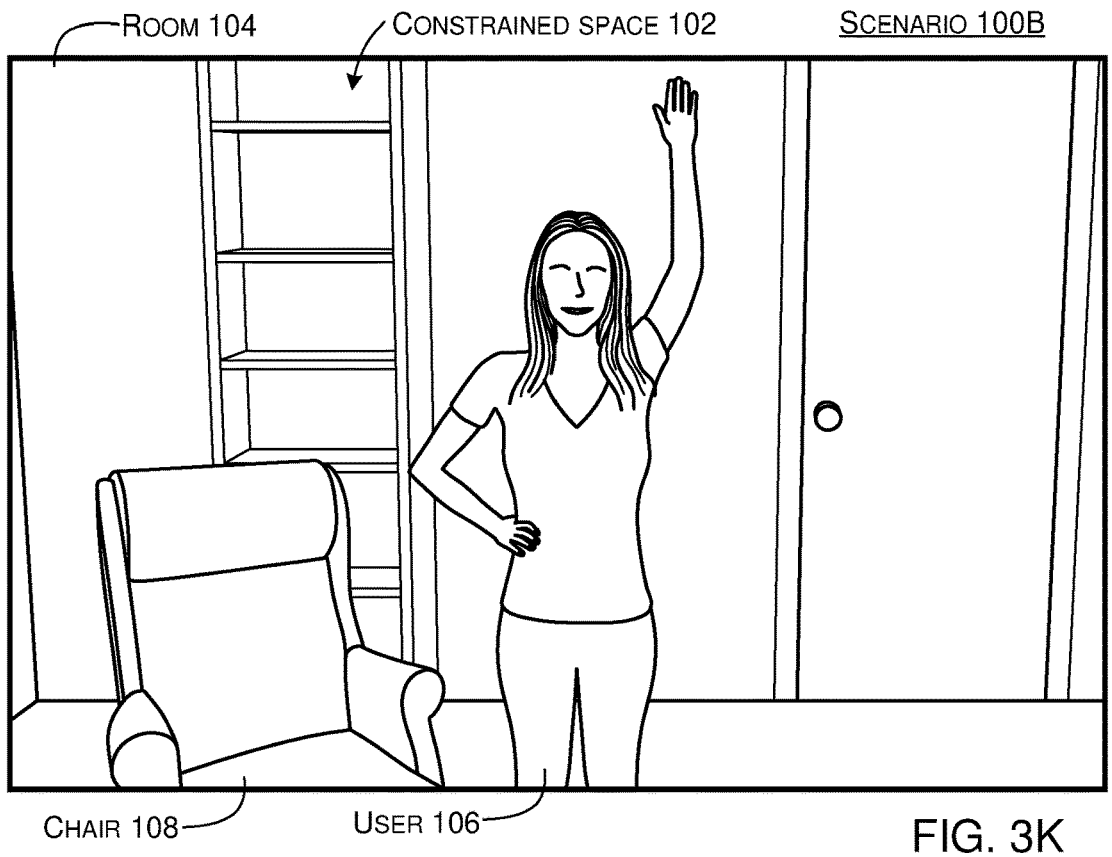
Figure 3L:
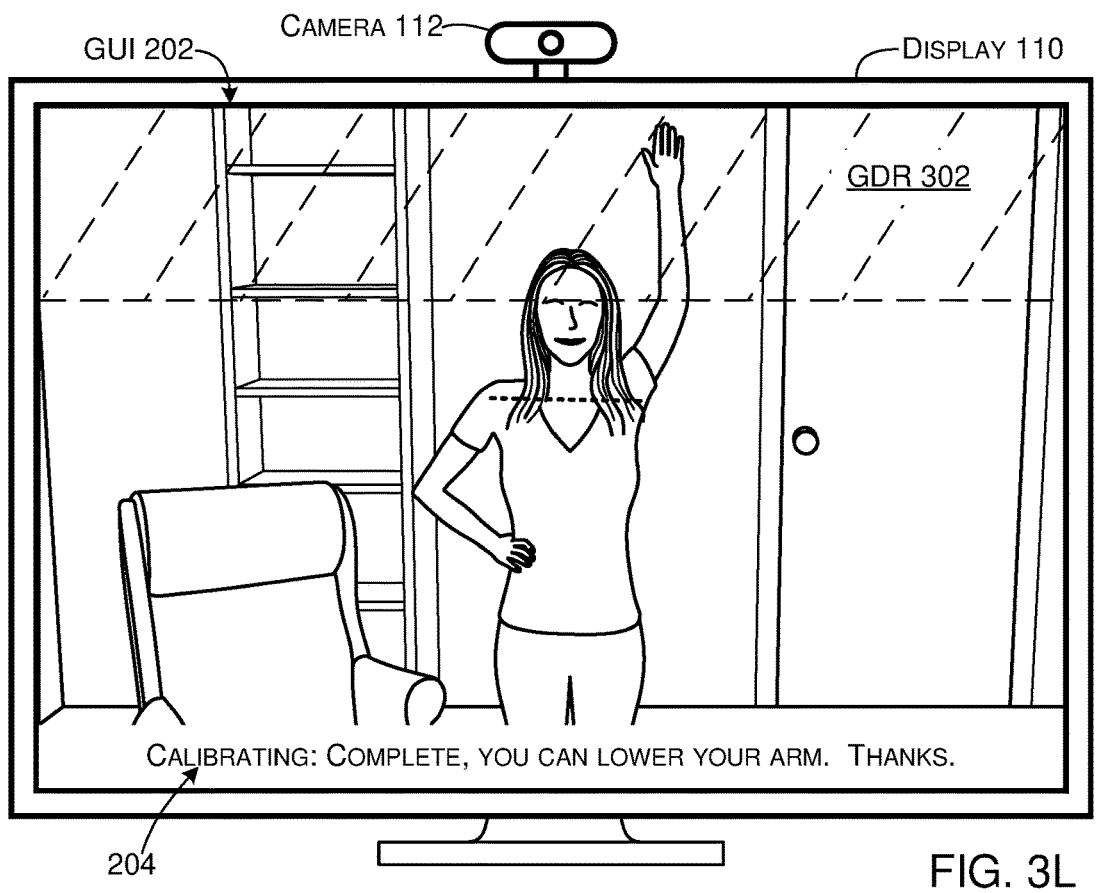
Figure 3M:
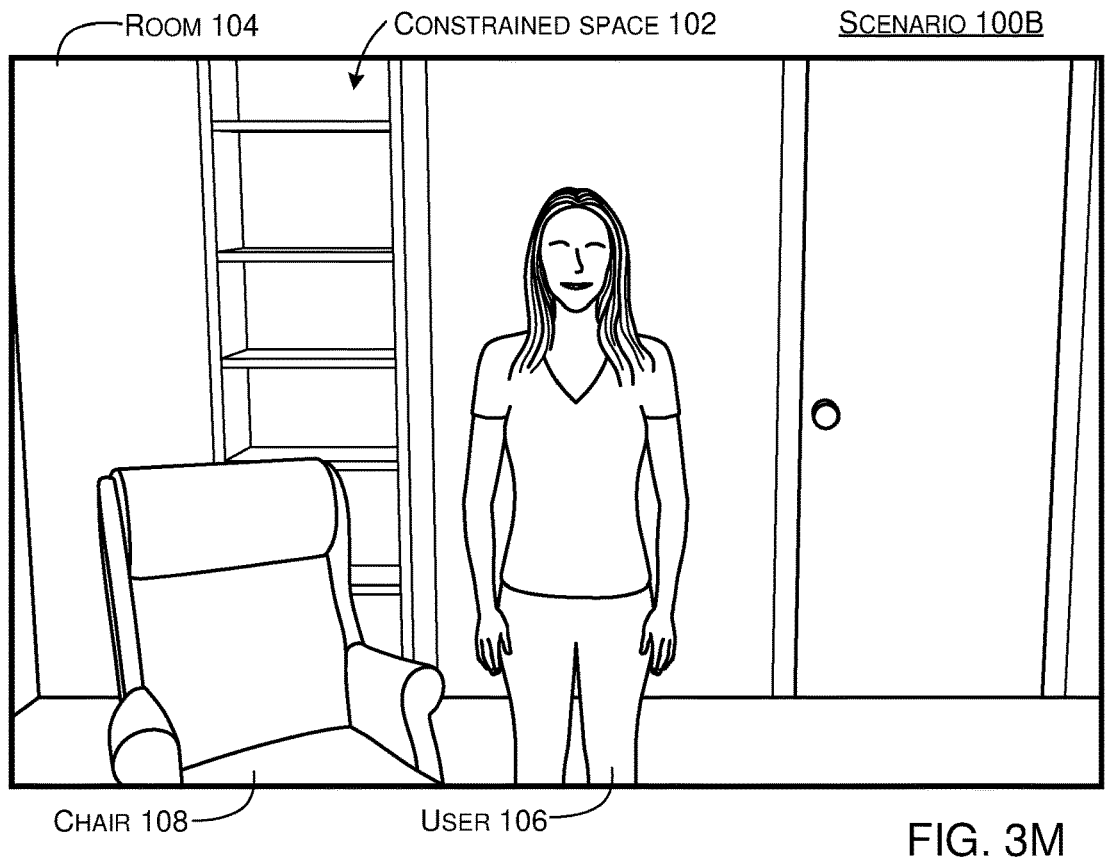
Figure 3N:
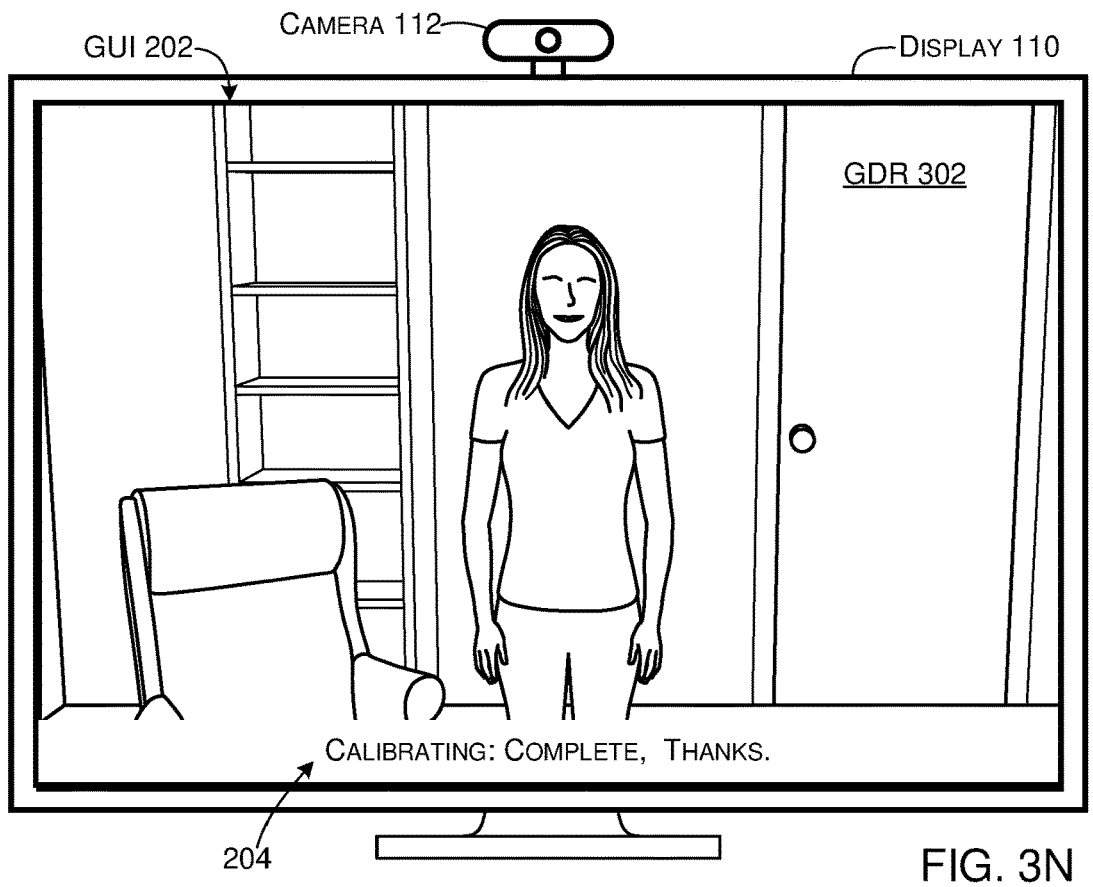

FIGS. 3A-3N collectively show another example calibration scenario 100B. The calibration process is starting in FIGS. 3A and 3B. This scenario includes a gesture detection region (GDR) 302 in the GUI 202. The gesture detection region 302 can increase a likelihood that the user is intending to perform a calibration gesture and that the gesture is accurately detected/interpreted. In this implementation, the gesture detection region 302 is defined partly by identifying the user's eyes in images captured by the camera 112. The gesture detection region 302 extends from the user's eyes toward the top of the captured image. The gesture detection region 302 can be dynamic so that when the user moves, the boundaries of the gesture detection region 302 can be re-determined. The gesture detection region could be based upon other biometric features, such as the top of the user's head or the user's shoulders, among others.

This implementation can also identify biometric parameters and use the biometric parameters in identifying the user and/or user gestures. In this example one biometric parameter is associated with identifying the user's shoulders and the width between them. In this case, the shoulder parameter is represented visually by a dotted shoulder parameter line 304 that has its endpoints defined by the location of the user's shoulders.

In reference to FIGS. 3A and 3B, the instructions 204 indicate that calibration is occurring and request that the user please stand in place and raise one hand into the dashed zone (e.g., the gesture detection zone 302).

FIGS. 3C and 3D show a subsequent point where the user is raising her hand into the gesture detection zone 302. Note that GUI 202 shows the gesture detection zone and the user's hand to give real time feedback to the user that the user is performing the gesture properly. For instance, if the user's hand is not raised high enough and thus is not in the gesture detection zone 302, the GUI 202 will visualize that. Based on the visual feedback the user can move her hand higher until it is in the gesture detection zone 302 and can be recognized for calibration purposes.

FIGS. 3E and 3F show a subsequent point where the user gesture of raising her arm into the gesture detection zone 302 was detected and images were captured of the user at this location performing the gesture. Now, this aspect of the calibration is complete and the instructions 204 indicate that the gesture was detected, and request that the user please lower her arm. Thus, the GUI 202 provides real-time visual feedback whether the user is properly performing the gesture and that the gesture has been detected (or not).

FIGS. 3G and 3H show a subsequent point where the GUI's instructions 204 are requesting that the user please take one step straight back to continue the camera calibration process.

FIGS. 3I and 3J show a subsequent point in the camera calibration process where the user has stepped back in accordance with the calibration instructions of FIG. 3H. The calibration instructions 204 are now requesting the user to please stand in place and raise one hand into the dashed zone (e.g., the gesture detection region 302). Thus, the hand raising constitutes a detectable gesture at a given location for imaging purposes associated with camera calibration.

FIGS. 3K and 3L show a subsequent point where the user 106 is performing the calibration gesture of raising her hand into the gesture detection region 302 as instructed in FIG. 3J. Recall that the gesture detection region 302 is represented on the GUI 202 so that the user receives real-time dynamic feedback about whether her arm is or is not in the gesture detection region (e.g., is she raising it high enough and is it being detected). Thus, the user is at a known or estimable location that is one step directly behind the location of FIGS. 3E and 3F where she previously performed the calibration gesture. Images can be captured of the user while she performs the calibration gesture. The calibration gesture can serve as confirmation that the user is at the intended location and is not moving. These images can be used for calibration purposes. Once adequate images are obtained, the calibration instructions 204 can explain to the user that calibration is complete and that she can lower her arm. Alternatively, if more images were needed and/or images were needed at another location, calibration instructions could be provided to the user to obtain these additional calibration images.

FIGS. 3M and 3N show the user at the conclusion of the calibration process as indicated by instructions 204. The user can now return to, or proceed to, other activities. Some of these activities may benefit from the camera calibration process. One such example is described below relative to FIGS. 5A-5C.

Figure 4A:
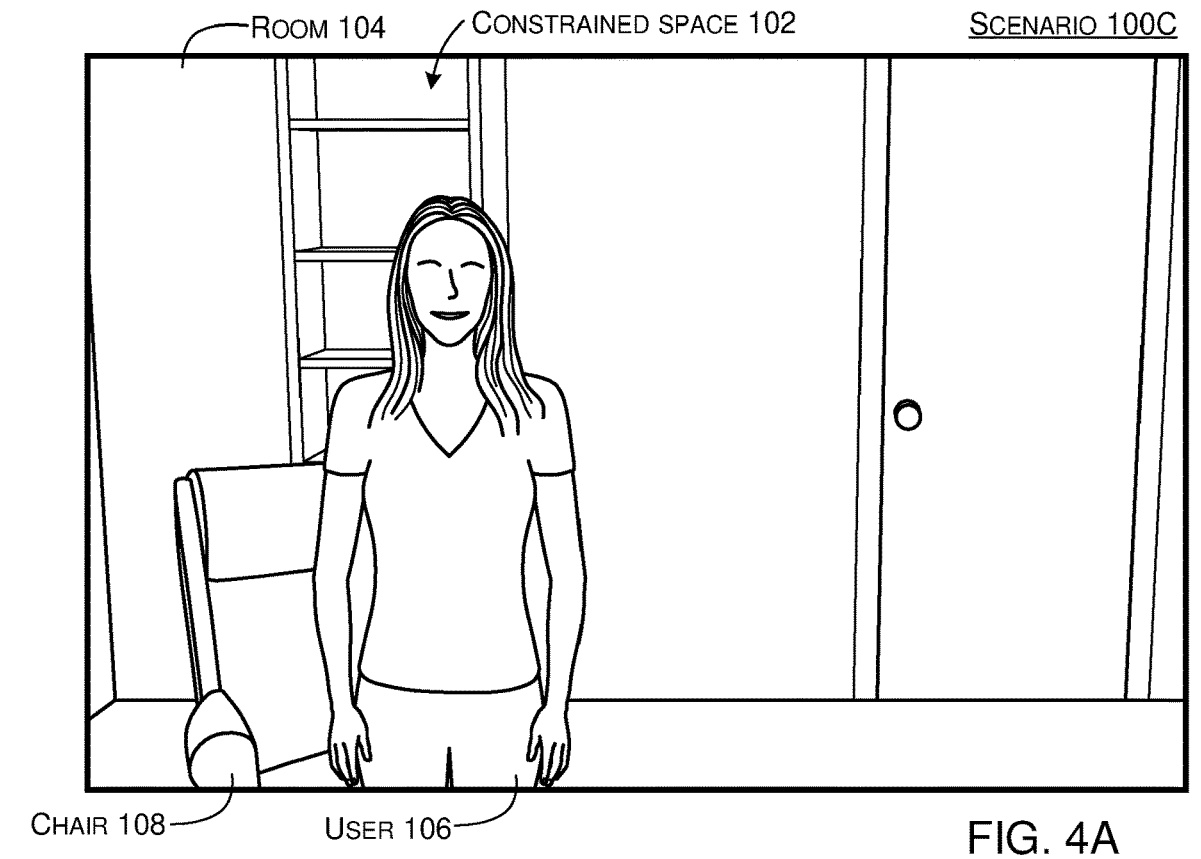
Figure 4B:
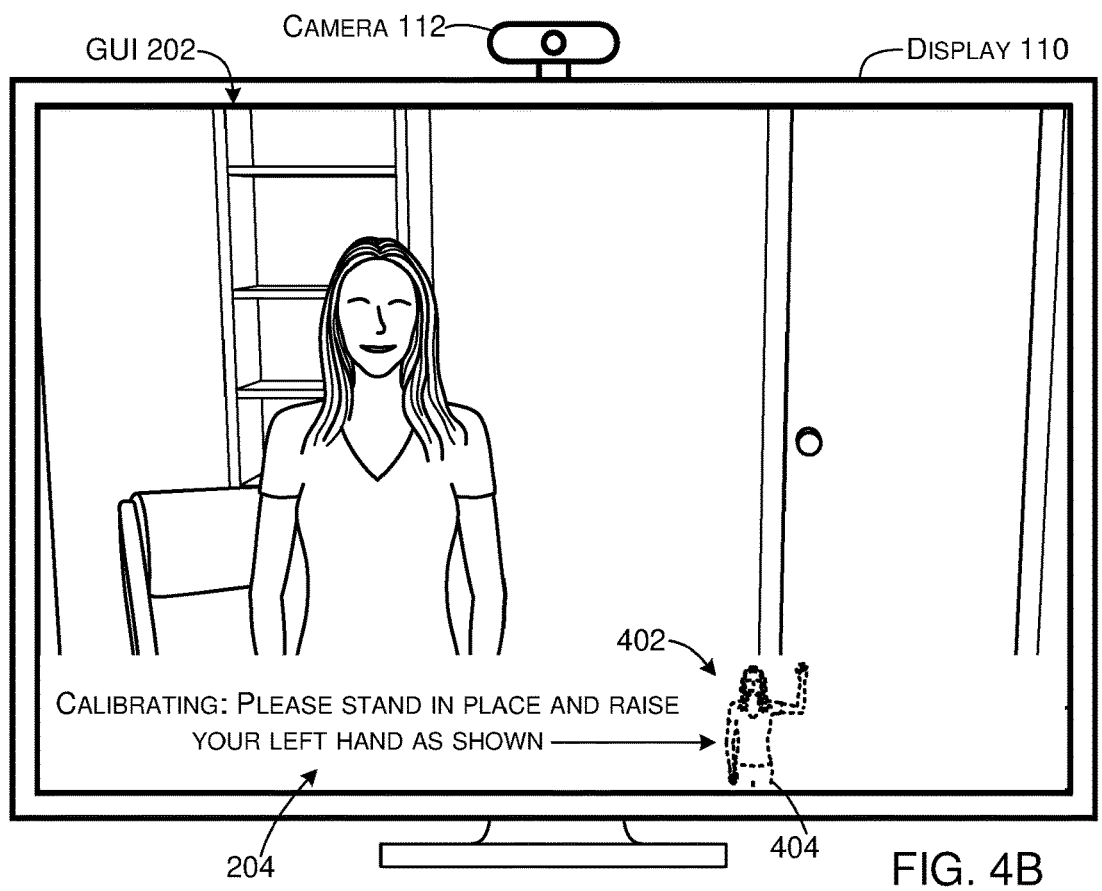

FIGS. 4A-4L collectively show another example calibration scenario 100C. The calibration process is starting in FIGS. 4A and 4B. In this example, the calibration instructions 204 include representations 402 of the user action. In FIG. 4B, the representations 402 include a representation of the requested user gesture as indicated at 404. The requested user gesture representation can be stick figures or modeled on the user with information from captured images of the user.

Figure 4C:
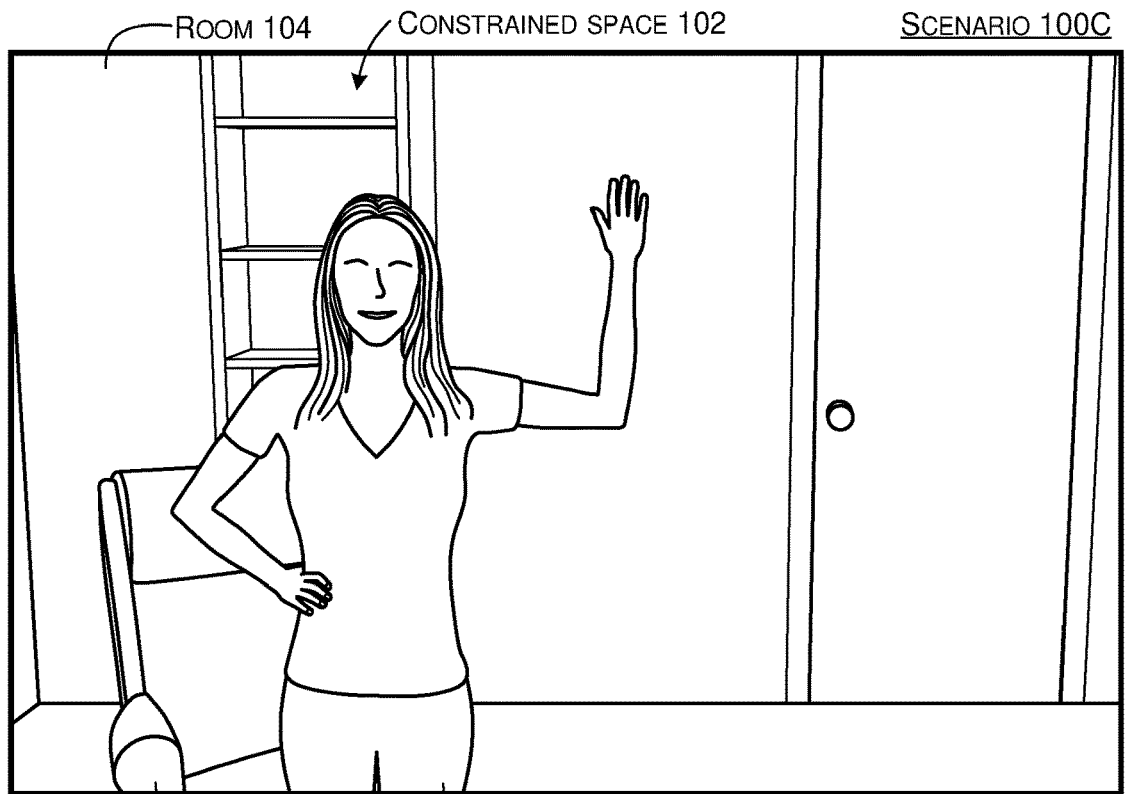
Figure 4D:
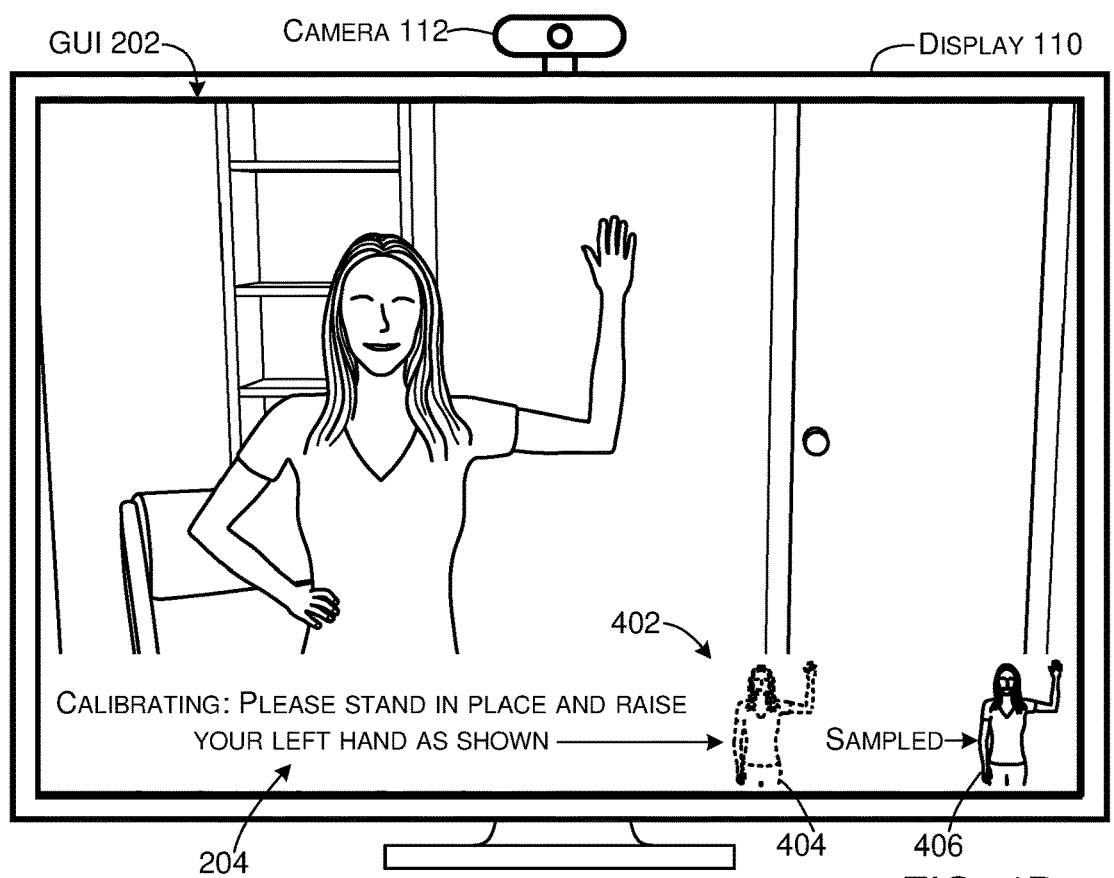

FIGS. 4C and 4D show a subsequent point where the user is performing the gesture requested in GUI 202 of FIG. 4B. In FIG. 4D, the instructions 204 continue to show the representation of the requested user gesture at 404. The instructions add real-time feedback with a visual representation (e.g., sensed calibration gesture) 406 of what the camera is sensing or sampling. Thus, the user can be provided with dynamic information so they can determine if they are performing the requested calibration gesture properly. Here, the representation of the requested calibration gesture at 404 and the sensed calibration gesture 406 match and so affirm for the user that she is properly performing the requested calibration gesture.

Figure 4E:
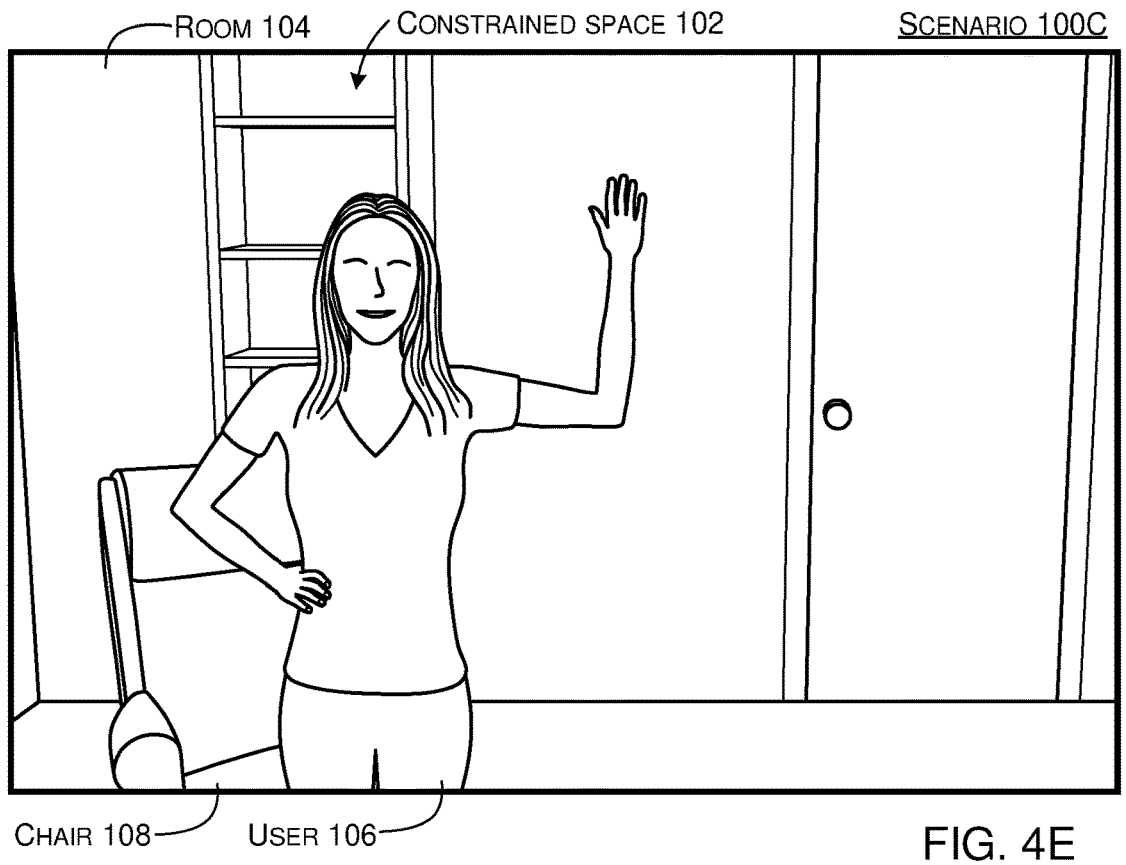
Figure 4F:
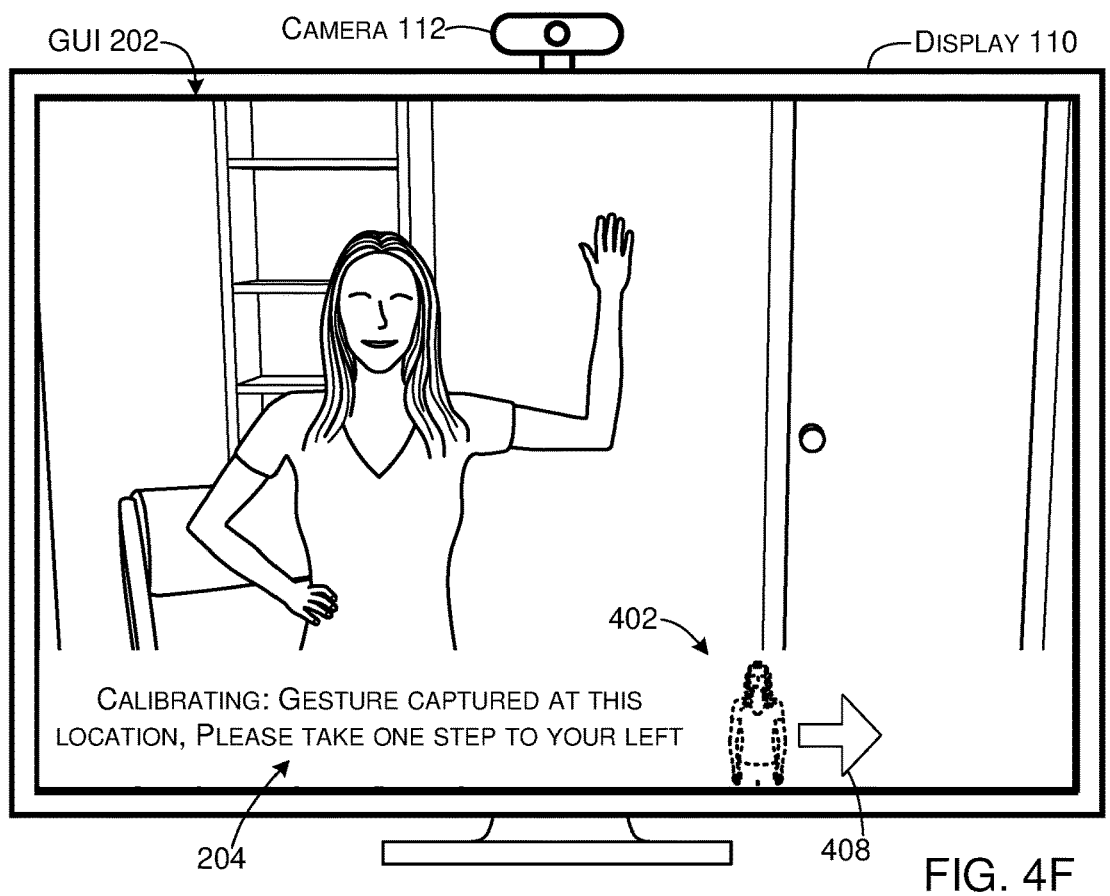

FIGS. 4E and 4F show a subsequent point where the gesture images have been captured at the present location. The calibration instructions 204 indicate that the gesture was captured at this location and request that the user please take one step to your left. This is also shown in the representations 402 with arrow 408 showing the requested direction of movement to a new location.

Figure 4G:
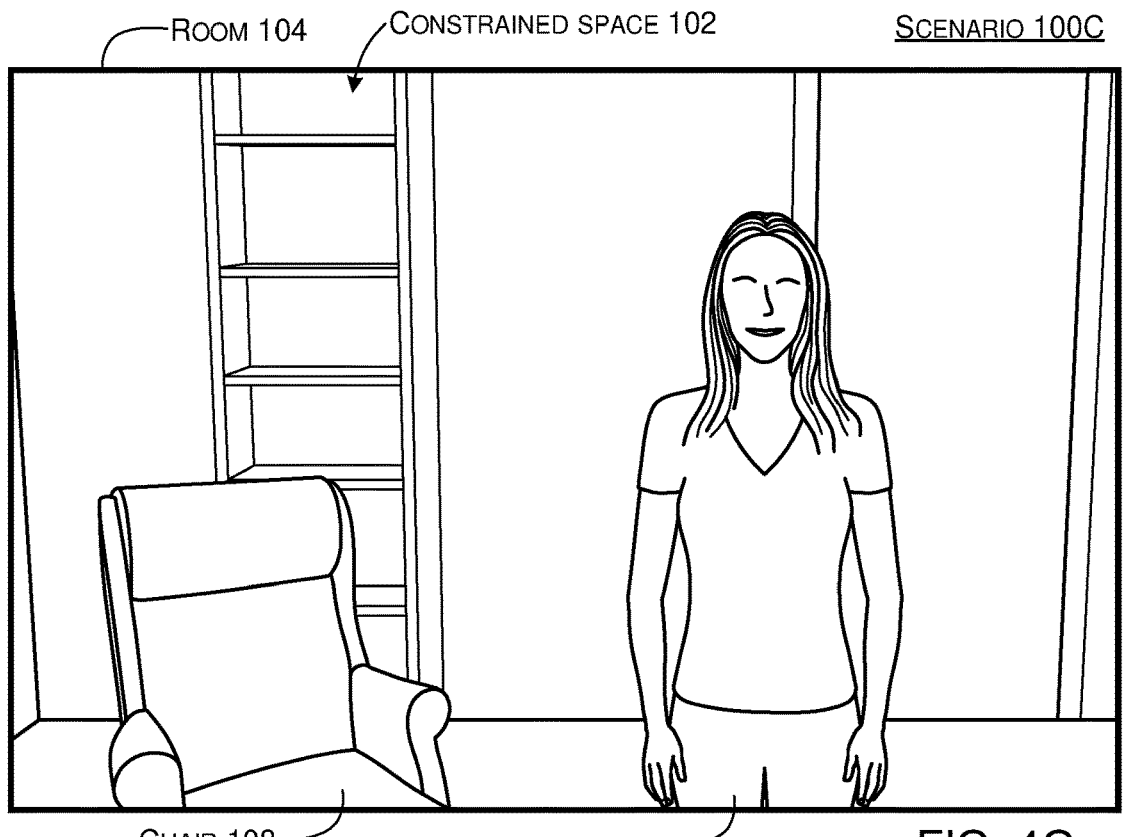
Figure 4H:
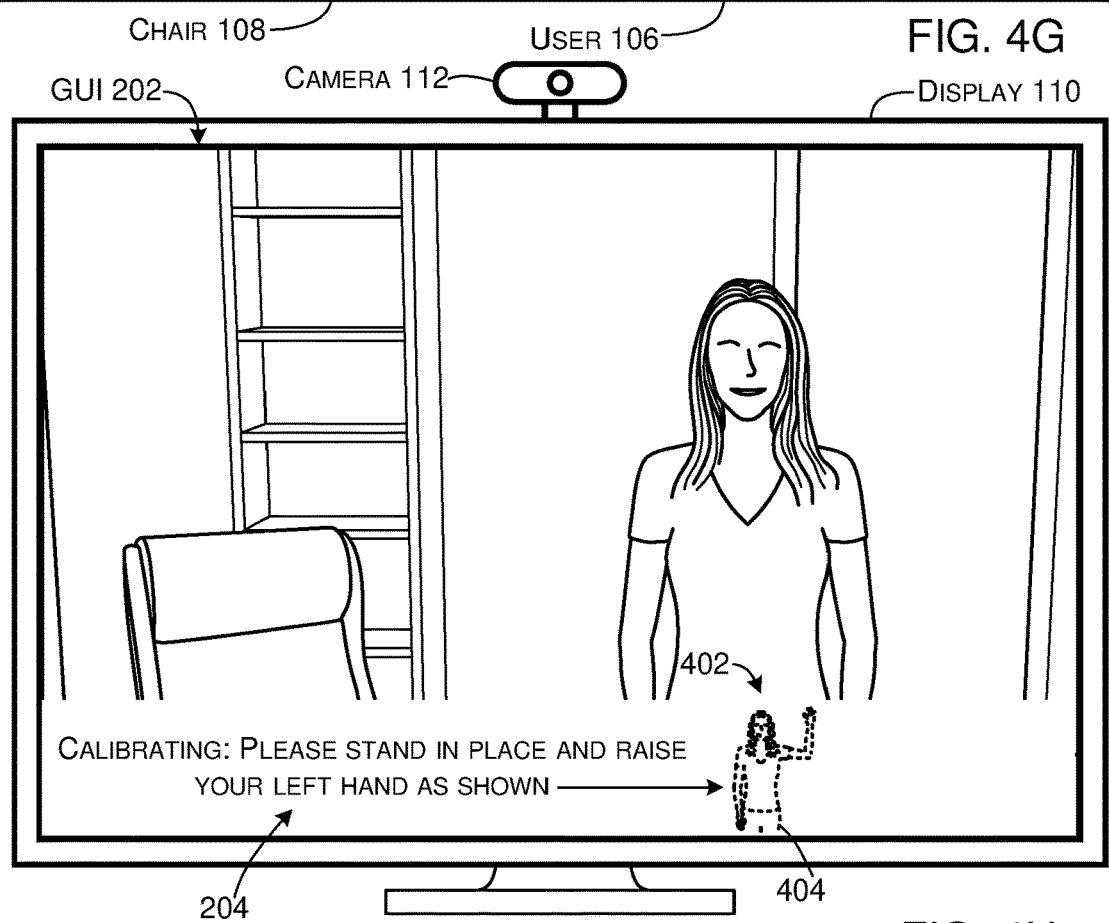

FIGS. 4G and 4H show the user at the new location which is lateral to the location of FIGS. 4A-4D. The instructions 204 are explaining the requested calibration gesture and the representations 402 are showing the requested calibration gesture at 404 similar to FIG. 4B.

Figure 4I:
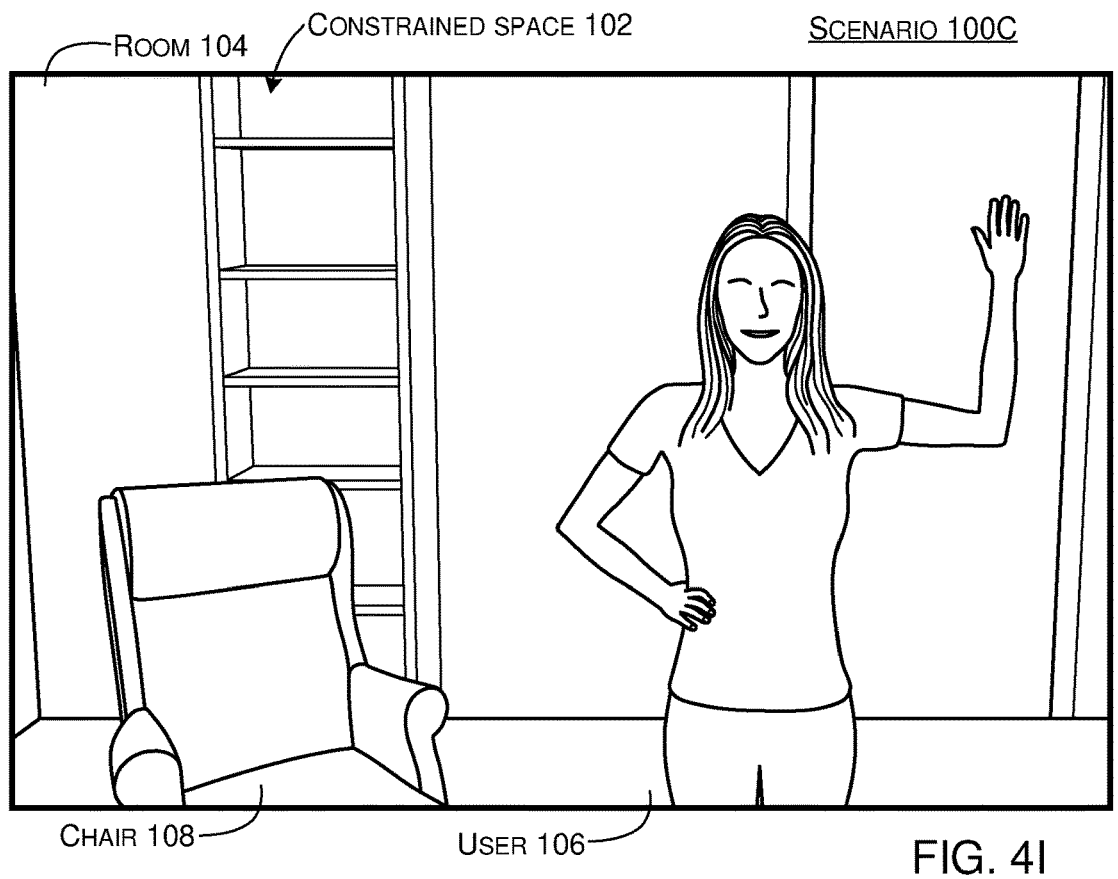
Figure 4J:
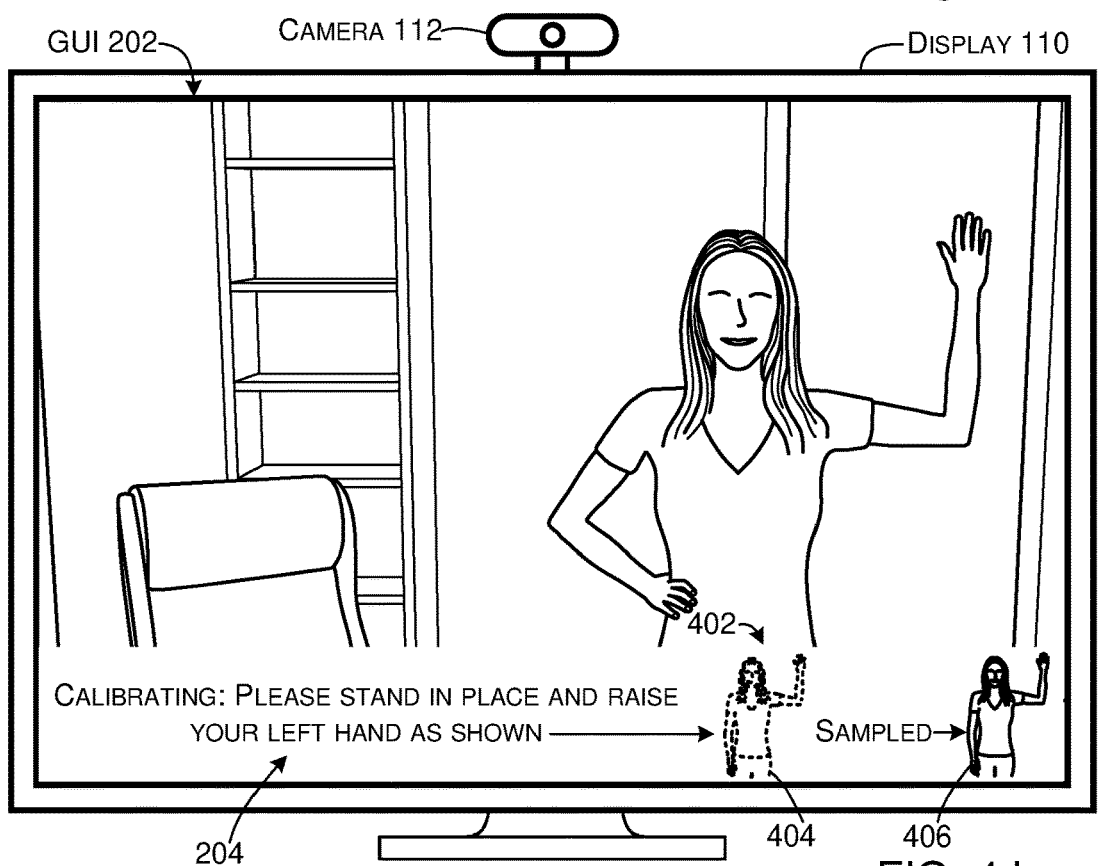

FIGS. 4I and 4J show a subsequent point where the user is performing the gesture requested in GUI 202 of FIG. 4H. FIGS. 4I and 4J are similar to 4C and 4D, respectively, except that the user is now at the second location rather than the first location. In FIG. 4J, the instructions 204 continue to show the representation of the requested user gesture at 404. The instructions add real-time feedback with a sensed calibration gesture 406 of what the camera is sensing or sampling. Thus, the user is provided with dynamic information so they can determine if they are performing the requested user gesture properly. Here, the representation of the requested user gesture at 404 and the sensed visual representation (e.g., sensed calibration gesture) 406 match and so affirm for the user that she is performing the requested gesture properly. Note that in this implementation, the requested calibration gesture 404 and the sensed calibration gesture 406 are represented side by side. However, other arrangements are contemplated. For instance, the requested calibration gesture 404 could be overlaid on the sensed calibration gesture 406. This would readily visualize any differences, and because the sensed calibration gesture 406 can be dynamically updated as more images are captured by the camera, the user could be adjusting their gesture until the requested calibration gesture 404 and the sensed calibration gesture 406 exactly match.

Figure 4K:
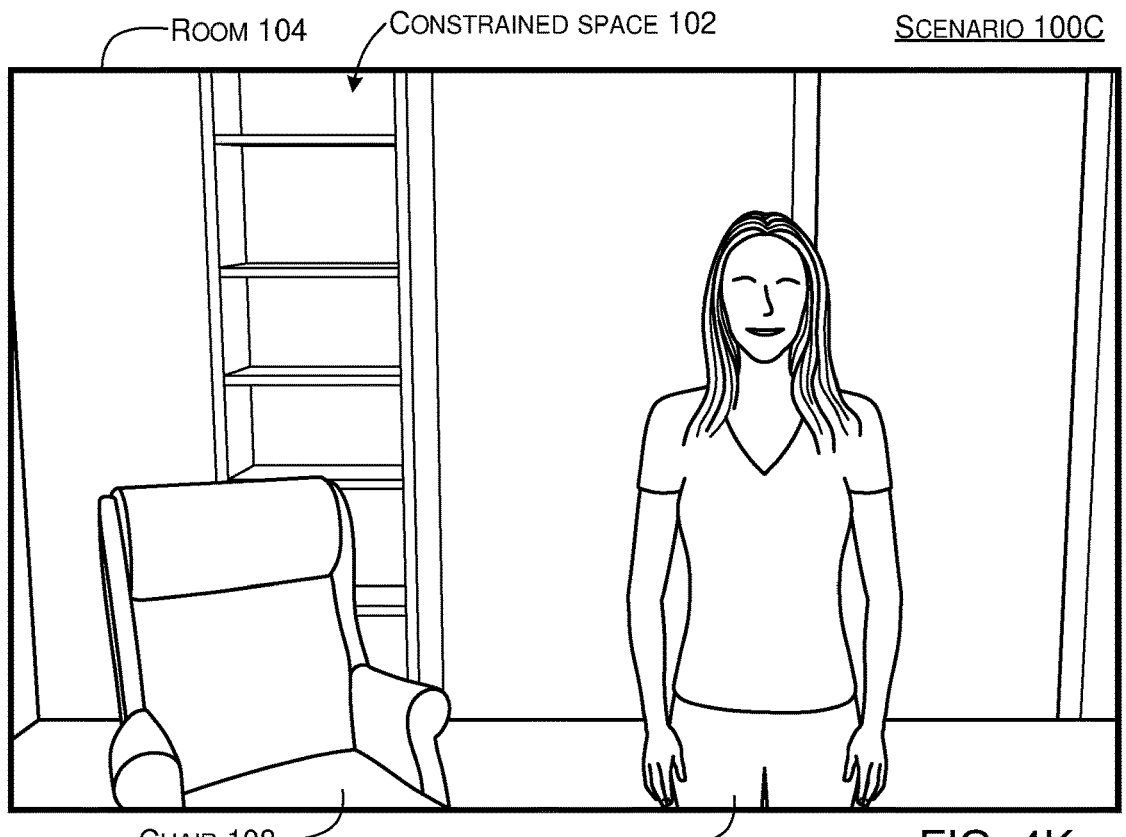
Figure 4L:
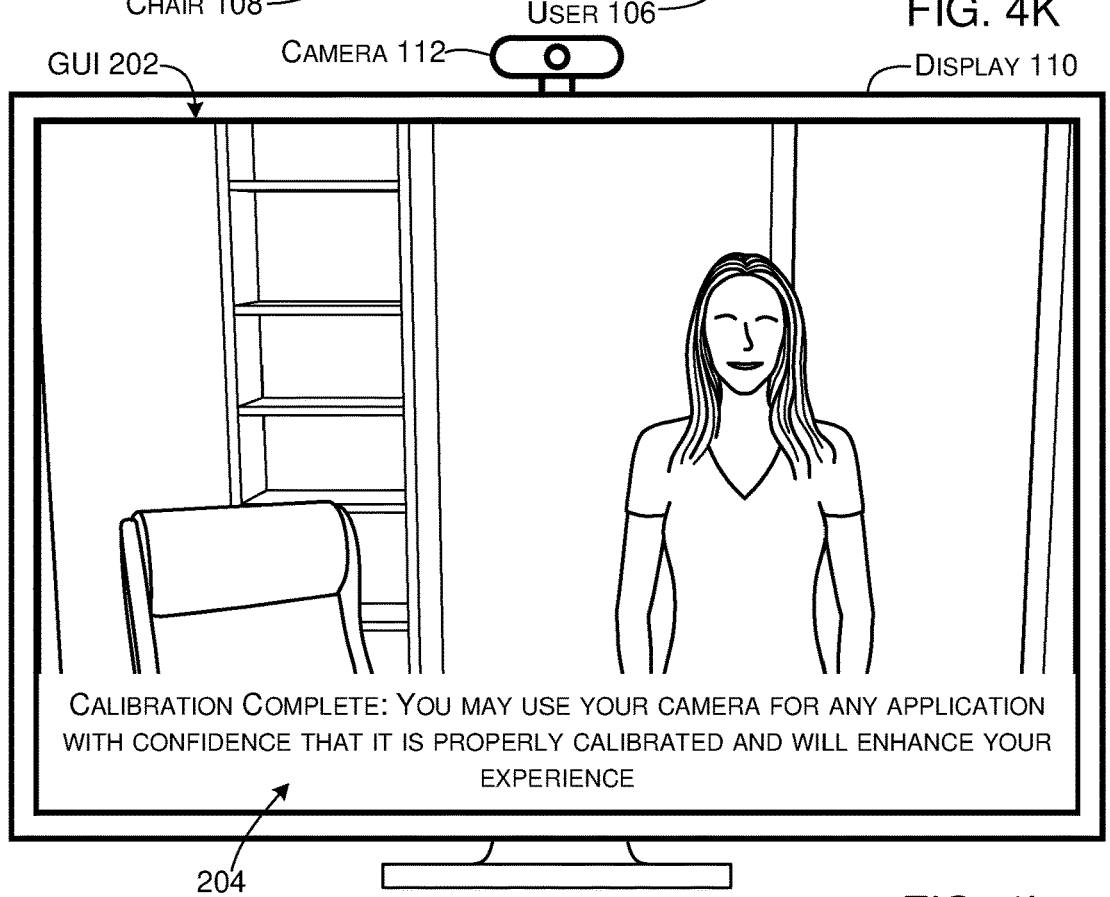

FIGS. 4K and 4L show a subsequent point where the camera calibration is complete and the calibrated camera 112 can enhance the user experience with any application as indicated by instructions 204. One such example camera usage is discussed below relative to FIGS. 5A-5C.

The camera calibration described above relative to FIGS. 2A-4L can be achieved in constrained environments where the camera cannot capture full body images of the user at some or all locations, such as due to the limited dimensions of the room and/or because of obstacles in the room, such as the chair 108. The camera calibration process can entail capturing the user's upper body at two or more locations. The user can be instructed to perform a gesture as an indicator that they are at the location. Various images can be captured at each location and images from the locations can be used in the calibration process. Various calibration parameters can be obtained from the images, such as locating the user's shoulders, their eyes, head size, height, etc. Other calibration parameters can be derived from the obtained calibration parameters. Camera calibration can be completed at least in part using the obtained calibration parameters and/or the derived calibration parameters. The calibration process can generate GUIs that guide the user through movements (e.g., steps) to locations and gestures at the locations to help ensure that the camera calibration process is successful.

Figure 5A:
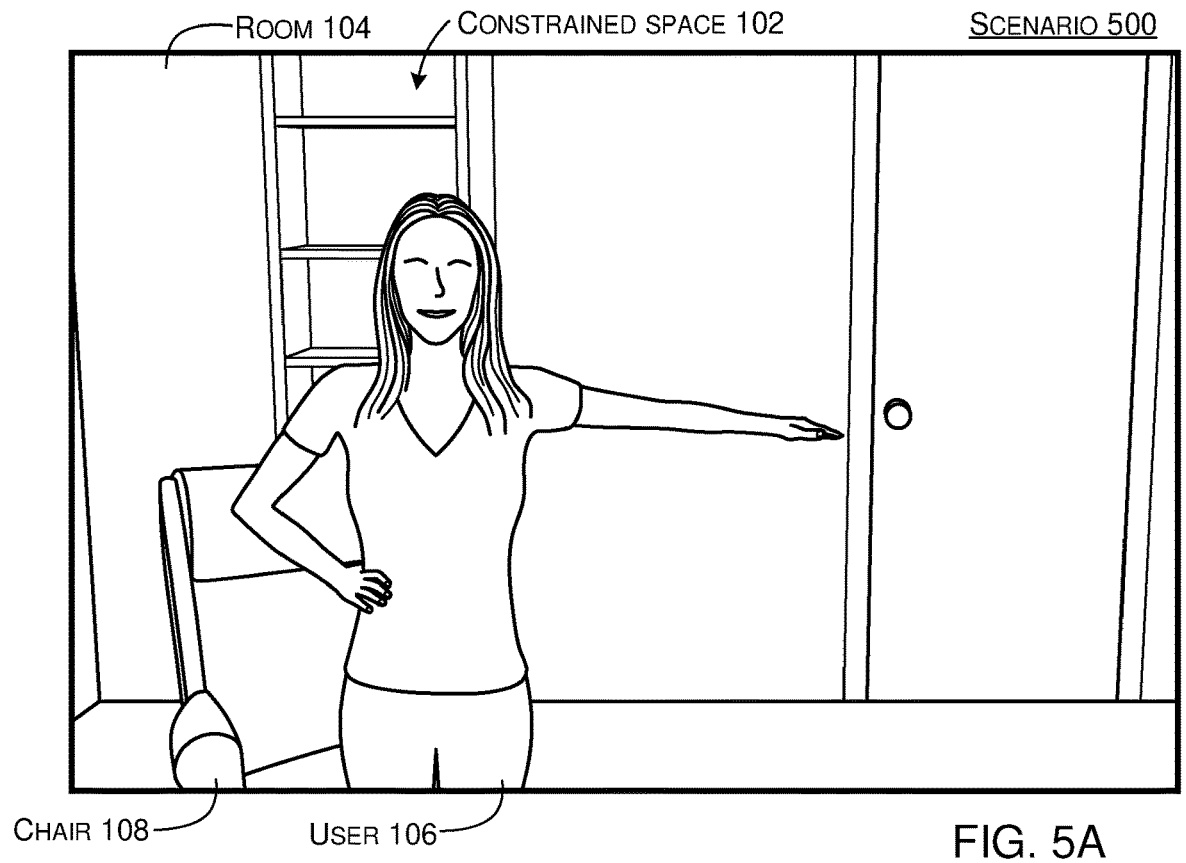
Figure 5B:
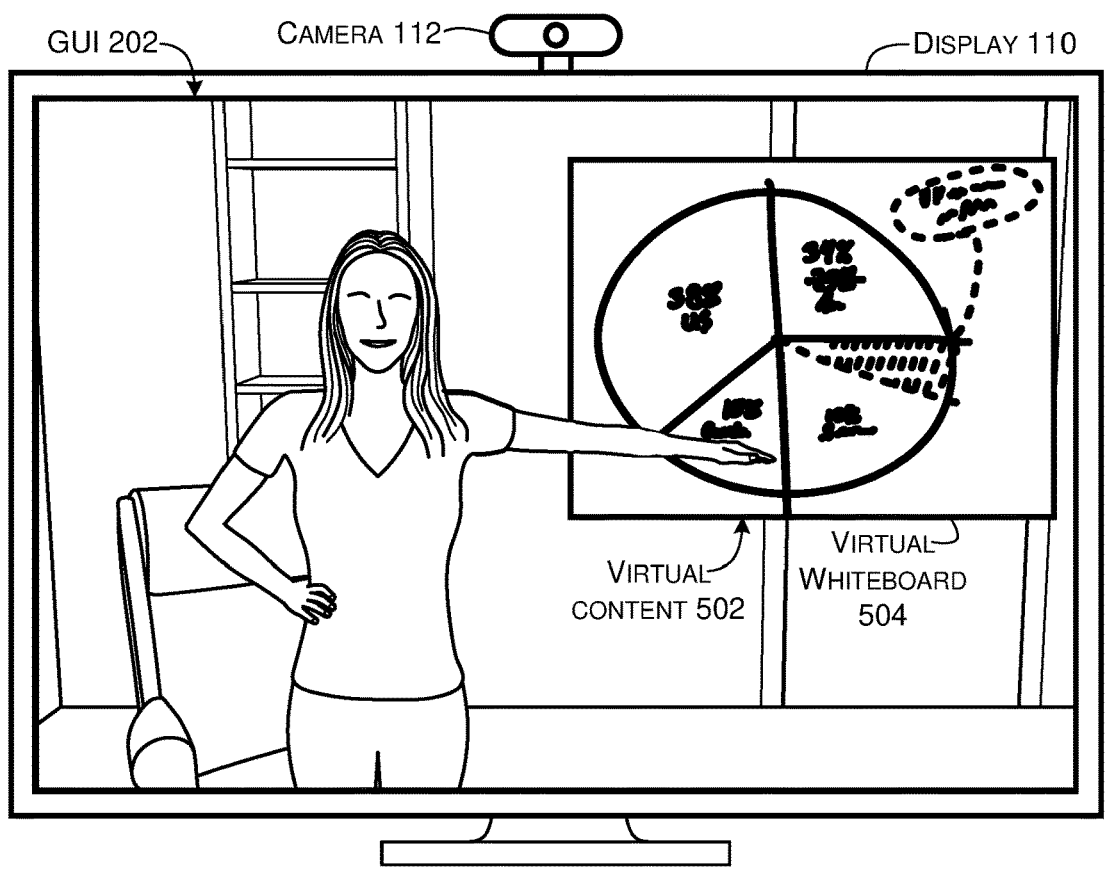
Figure 5C:
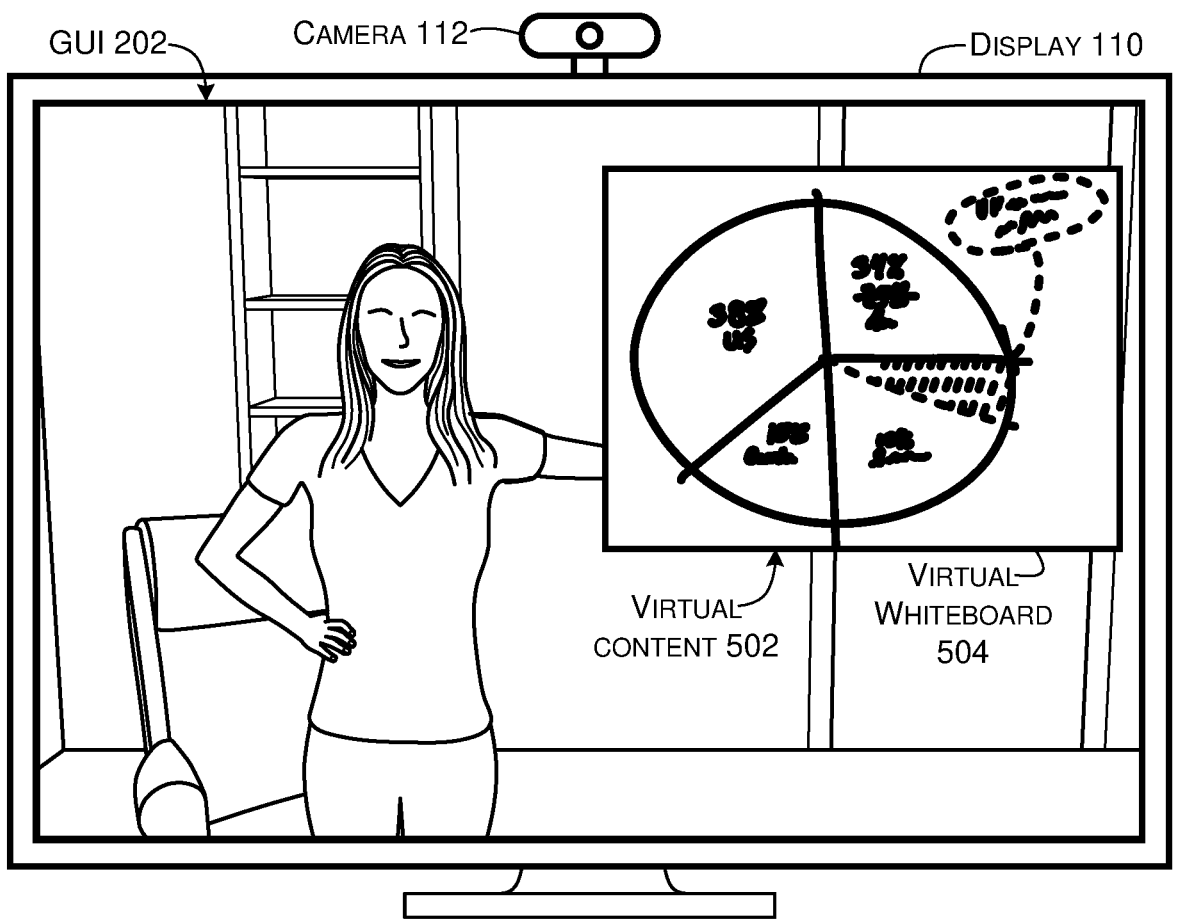

FIGS. 5A-5C show an example use-case scenario 500 where a camera calibrated utilizing the present calibration concepts can enhance the user experience and an uncalibrated camera can detract from the user experience. FIG. 5A shows the user 106 in the room 104. In this example, the user is presenting virtual content 502 in an augmented virtual meeting. FIGS. 5B and 5C show 2D or 3D virtual content 502, in the form of a virtual whiteboard 504 that is projected into the 3D space of the room 104. Note that the virtual content 502 is not actually present in the room 104 with the user 106. Instead, FIGS. 5B and 5C show potential integration (e.g. spatial relationships) of the virtual content 502 and the real content of the room 104 as could be displayed for the user on GUI 202 and to other remote users in the augmented virtual meeting on their own GUIs.

FIG. 5B shows correct integration of real content (e.g., the user 106 and the room 104) with the virtual content 502 as enabled by calibrated camera 112. In this case, the user intends to reach in front of the virtual content (e.g., virtual whiteboard 504) to point to a specific portion of the virtual content. The calibrated camera can ensure the proper spatial relationship and thus interaction between the user 106 (e.g., the user's arm) and the virtual content 502.

FIG. 5C shows potential incorrect integration of the real content (e.g., the user 106 and the room 104) with the virtual content 502 with an uncalibrated or improperly calibrated camera 112. In this example, the user intended to reach in front of the virtual content, but instead, her arm disappeared behind the virtual content. This occurrence is likely distracting to the user and confusing to the remote users and thus diminishes the overall user experience associated with the augmented virtual meeting compared to the properly calibrated camera scenario of FIG. 5B. Of course, this is only one example scenario where camera calibration can contribute to user satisfaction and the skilled artisan should recognize other scenarios.

Figure 6:
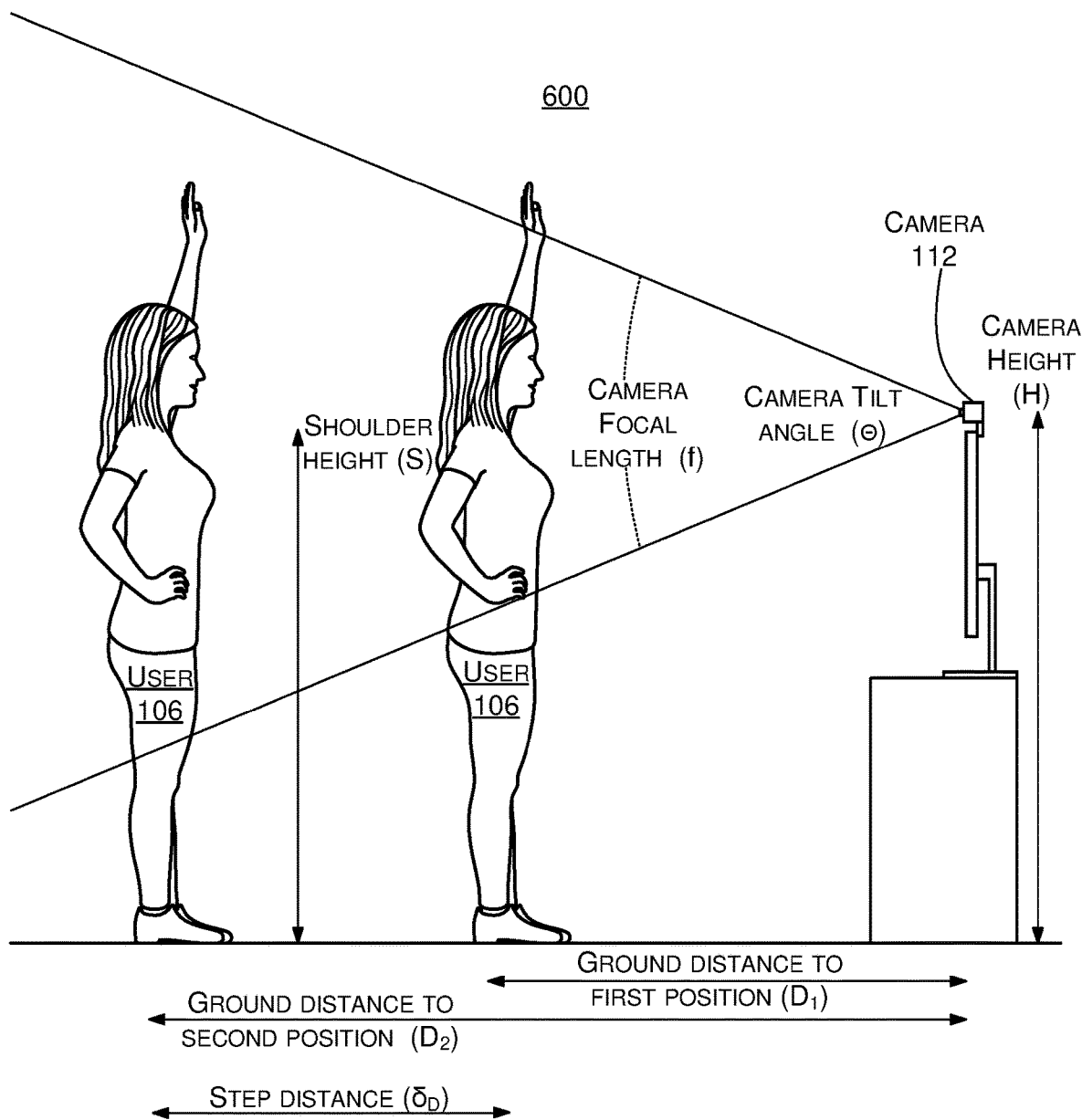

FIG. 6 shows a calibration parameter derivation technique 600. The technique 600 is explained relative to user 106 and camera 112. Various techniques for capturing partial body images of the user at known locations are described above relative to FIGS. 2A-4L. Recall that the user was instructed to perform a calibration gesture that confirmed the user was at a specific location.

The locations can be separated by a known or estimated distance. For example, a length of a user's step can be estimated as a fraction of a user's height or a fraction of a user's shoulder height. For instance, one suitable estimation can entail step length/0.43=height. If either the height or the step length can be determined, the other one can be calculated using this equation. Thus, calibration parameters that can be discerned from the images of the user at the location, such as shoulder height, can contribute to deriving another calibration parameter, such as step distance. From one perspective, various external parameters, such as parameters relating to the user, the room (e.g., environment), and/or the camera can be determined and then other parameters, such as other external parameters, such as camera height, camera tilt, camera rotation, and/or internal parameters, such as camera focal length, can be determined from the known parameters.

As mentioned, various parameters can be obtained from the images captured of the user at the known locations or positions, such as the first location and the second location. At these locations, human body parts, which can include but are not limited to, two parallel human shoulders, two eyes, head size, open arms etc., can be identified and then used for calibrating the camera.

Using the user's shoulder as an example, the user can be instructed to stand still facing the camera, make a calibration gesture to signal the first location. The camera can capture images of the user at the first location. The user can be instructed to move one or more steps in a particular direction to the next (e.g., second) location. In this example, the direction is directly away from the camera, but other directions can be employed. When the user performs the calibration gesture to indicate the second location, the camera can capture images of the user at the second location. The distance between the first and second locations can be estimated from the user's height and number of steps he/she moved. Various algorithms can be employed to derive/determine unknown calibration parameters from known calibration parameters. One example algorithm is as follows:

H: camera height.
θ: camera tilt angle.
f: camera focal length.
$D_1$: the ground distance between the first location and the camera.
$D_2$: the ground distance between second location and the camera.
S: user shoulder height in space.
$d_y$: user shoulder vertical distance to image center.
$\delta_D$: the distance between the first and second locations (e.g., step distance).

In this example, the camera focal length f, camera tilt angle θ, and camera height H are unknown and can be derived from other calibration parameters. Given a set of f, θ, H, the technique can be utilized to calculate the ground distance (e.g., shoulder horizontal distance) from a specific location to the camera as follows:

$$\delta_\theta = \tan^{-1}\frac{d_y}{f}$$

$\delta_\theta$ calculates the vertical shift angle between the camera optical axis and the vector of human (e.g., user's) shoulder key point to optical center.

$$\beta = \frac{\pi}{2} - (\theta + \delta_\theta)$$

β calculates the angle between a horizontal line and the vector of human shoulder key point to optical center.

$$\delta_H = H - S$$

$\delta_H$ is the vertical distance between camera height and the human shoulder height in physical space.

$$D = \frac{\delta_H}{\tan\beta}$$

D is the ground horizontal distance from a human position to the camera.

From this, the technique can calculate two ground distances $D_1$ and $D_2$. The two ground distances can then be utilized to optimize H, e, fin the following function $$\min_{H,f,\theta}||D_1 - D_2| - \delta_D|$$

In this equation, distance one minus distance two should be equivalent to the step distance. Thus, performing the calculation until agreement is reached (e.g., the difference is minimized) can provide accurate values for the camera focal length f, camera tilt angle θ, and camera height H. From another perspective, this equation seeks accurate and potentially the best parameter combinations using the equations above that will fit the current human observations given the human size and relative locations are roughly known. Further, some configurations can utilize the shoulder width and locations as a guidance to estimate the initial value of focal length and tilt-up angle, so this equation can find the camera model more robustly.

In turn, these values can be used to calibrate the camera to the user and the constrained space. Also, recall that as introduced relative to FIGS. 2A-2R, the user can perform calibration gestures at more than two locations. In that example, the user performed gestures at three locations with the first two locations separated by a step and the second two locations separated by a step. The above calculations could be performed on the first and second locations and the second and third locations to check and/or further refine the calculated values for camera focal length f, camera tilt angle θ, and/or camera height H parameters.

From one perspective, various external parameters, such as parameters about the user and/or the room can be obtained from images from the camera. For instance, the user's shoulder width can be determined from the images. These obtained parameters can then be treated as known parameters. Other parameters can be determined or derived using the known parameters. For instance, the user's height can be determined without relying on full body images of the user. For example, the user's height can be estimated from the shoulder width obtained from images of the user's upper body. These parameters can in turn be used to calculate or derive various internal and/or external camera parameters, such as camera height, camera tilt angle, and/or camera focal length. The camera can be calibrated using any combination of these parameters. The calibration can provide a contextual understanding of the camera in its environment including the user and/or the room in the above examples.

Figure 7:
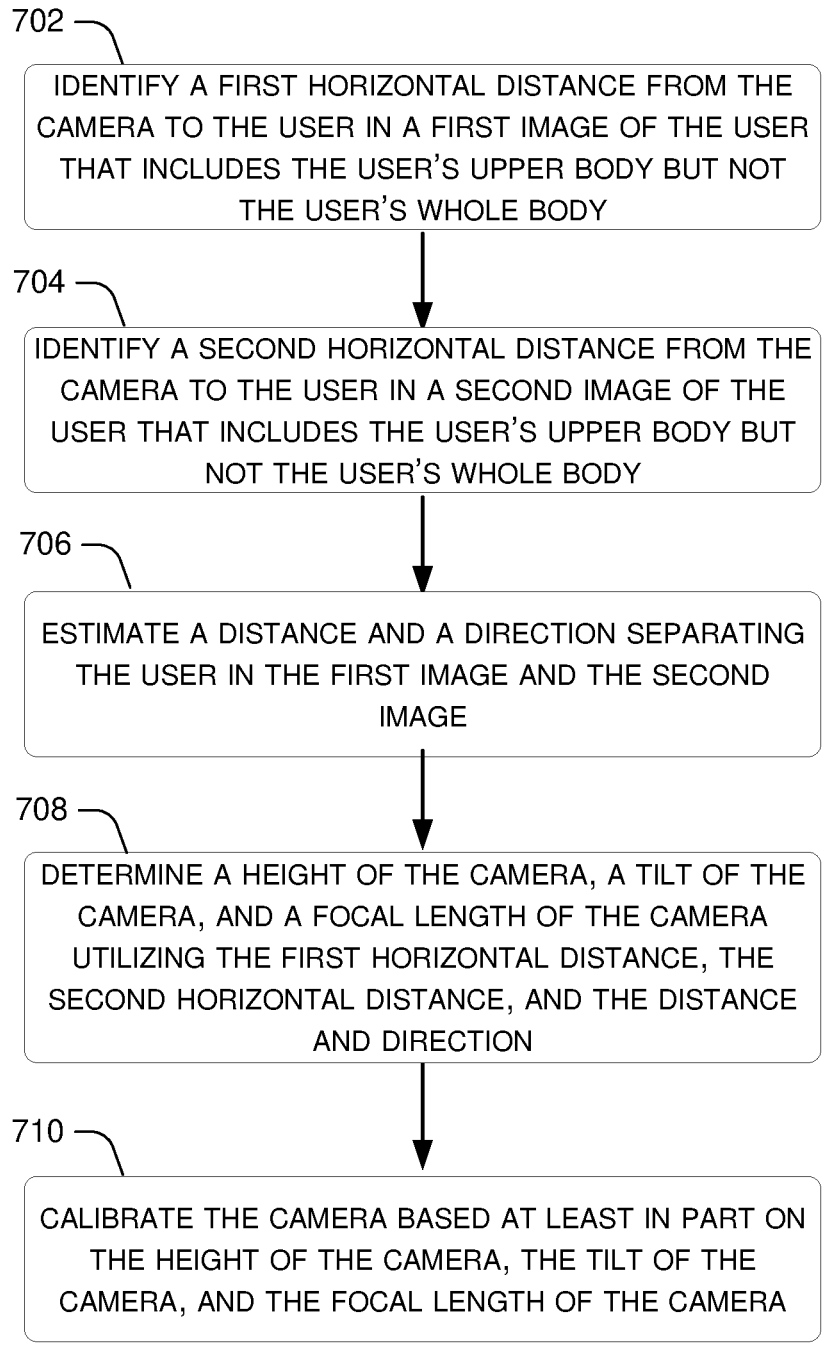
FIGS. 7-10 show example flowcharts for accomplishing camera calibration concepts in accordance with some implementations.

FIG. 7 shows an example camera calibration method or technique 700.

Block 702 can identify a first horizontal distance from the camera to the user in a first image of a user that captures the user's upper body but not the user's whole body.

Block 704 can identify a second horizontal distance from the camera to the user in a second image of the user that captures the user's upper body but not the user's whole body.

Block 706 can estimate a distance and a direction separating the user in the first image and the second image. Stated another way, the estimate can relate to how far, and in what direction, the user moved. For instance, the user could have moved one step straight away from the camera. In another example, the user could have taken two steps at a 45-degree angle away from the camera. The distance can be calculated based upon a ratio of user height to step length or user shoulder height to step length, among other techniques.

Block 708 can determine a height of the camera, a tilt of the camera, and/or a focal length of the camera utilizing, at least in part, the first horizontal distance, the second horizontal distance, and the distance and/or direction.

Block 710 can calibrate the camera based at least in part on the height of the camera, the tilt of the camera, and/or the focal length of the camera.

Figure 8:
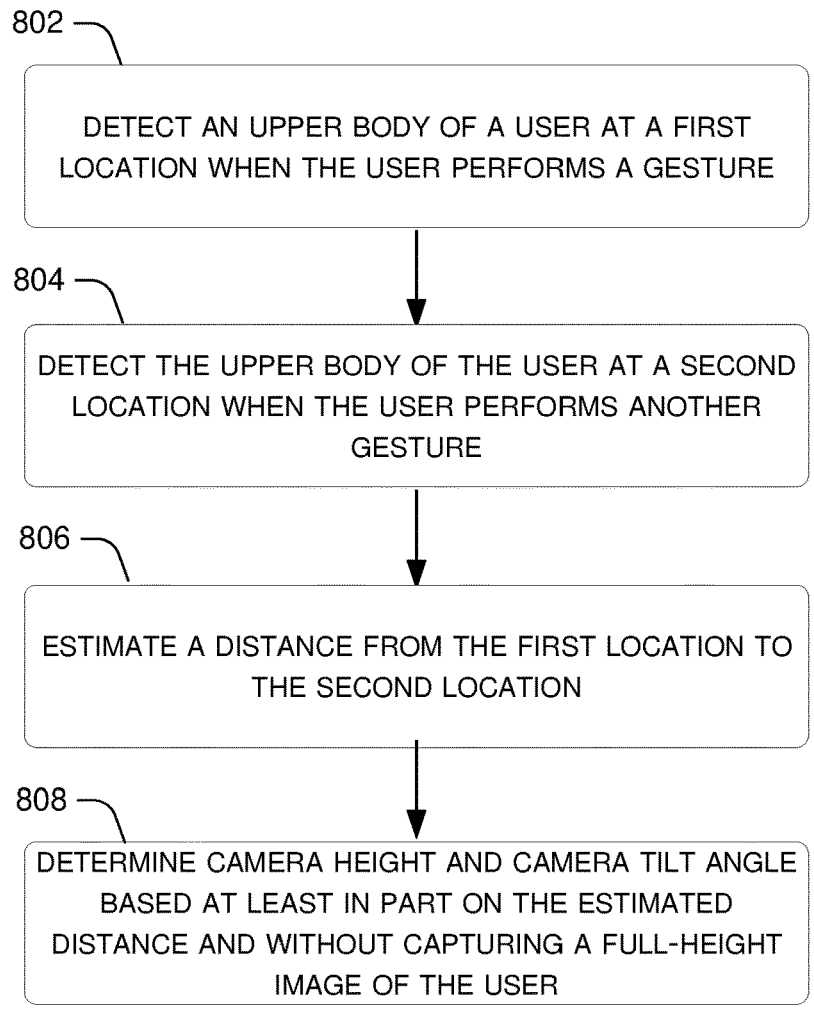

FIG. 8 shows another example camera calibration method or technique 800.

Block 802 can detect an upper body of a user at a first location when the user performs a gesture.

Block 804 can detect the upper body of the user at a second location when the user performs another gesture.

Block 806 can estimate a distance from the first location to the second location.

Block 808 can determine camera height and camera tilt angle based at least in part on the estimated distance and without capturing a full-height image of the user.

Figure 9:
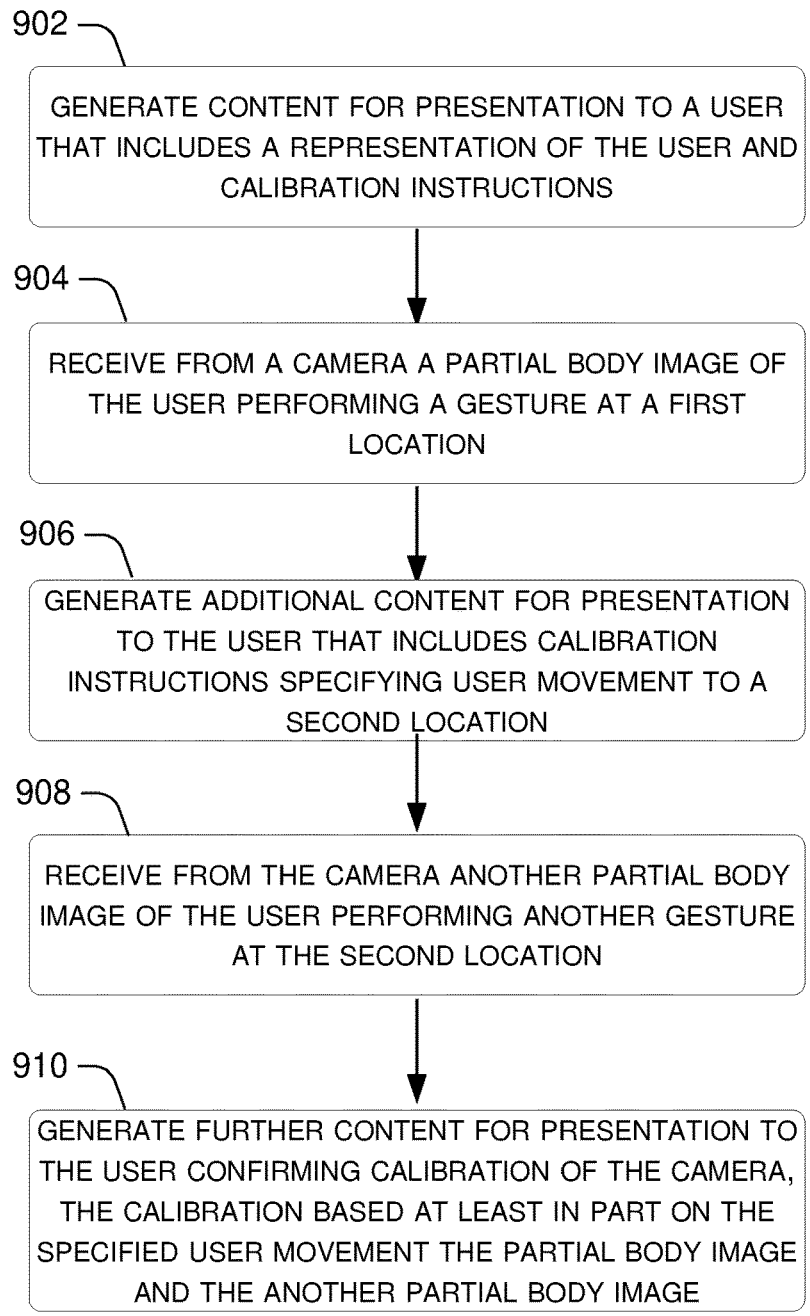

FIG. 9 shows another example camera calibration method or technique 900.

Block 902 can generate content for presentation to a user that includes a representation of the user and calibration instructions.

Block 904 can receive, from a camera, a partial body image of the user performing a gesture at a first location.

Block 906 can generate additional content for presentation to the user that includes calibration instructions specifying user movement to a second location.

Block 908 can receive, from the camera, another partial body image of the user performing another gesture at the second location.

Block 910 can generate further content for presentation to the user confirming calibration of the camera, the calibration based at least in part on the specified user movement, the partial body image, and/or the another partial body image.

Figure 10:
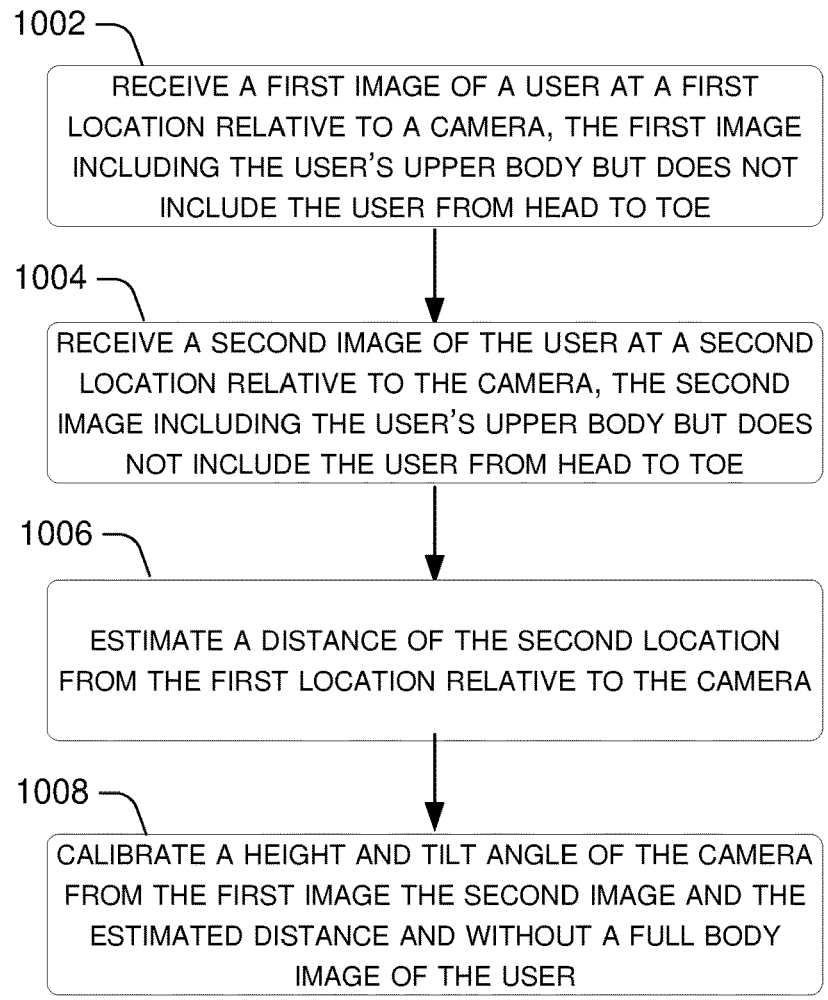

FIG. 10 shows another example camera calibration method or technique 1000.

Block 1002 can receive a first image of a user at a first location relative to a camera, the first image including the user's upper body but does not include the user from head to toe.

Block 1004 can receive a second image of the user at a second location relative to a camera, the second image including the user's upper body but does not include the user from head to toe.

Block 1006 can estimate a distance of the second location from the first location relative to the camera.

Block 1008 can calibrate a height and tilt angle of the camera from the first image, the second image, and the estimated distance, and without a full body image of the user.

The order in which the disclosed methods are described is not intended to be construed as a limitation, and any number of the described acts can be combined in any order to implement the method, or an alternate method. Furthermore, the methods can be implemented in any suitable hardware, software, firmware, or combination thereof, such that a computing device can implement the method. In one case, the methods are stored on one or more computer-readable storage media as a set of instructions such that execution by a processor of a computing device causes the computing device to perform the method.

Figure 11:
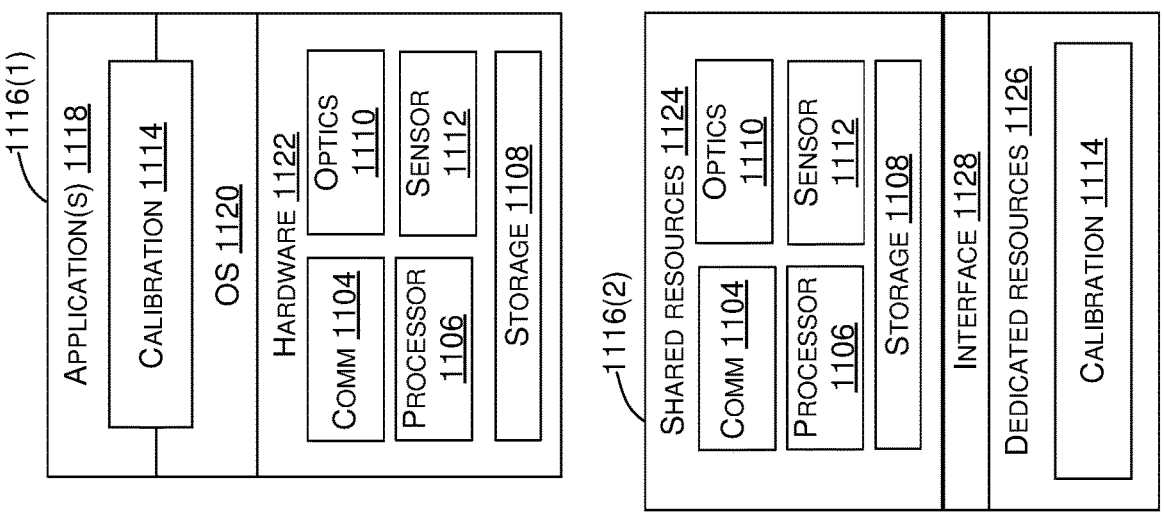
FIG. 11 shows an example system for accomplishing camera calibration concepts in accordance with some implementations.
Figure 11:
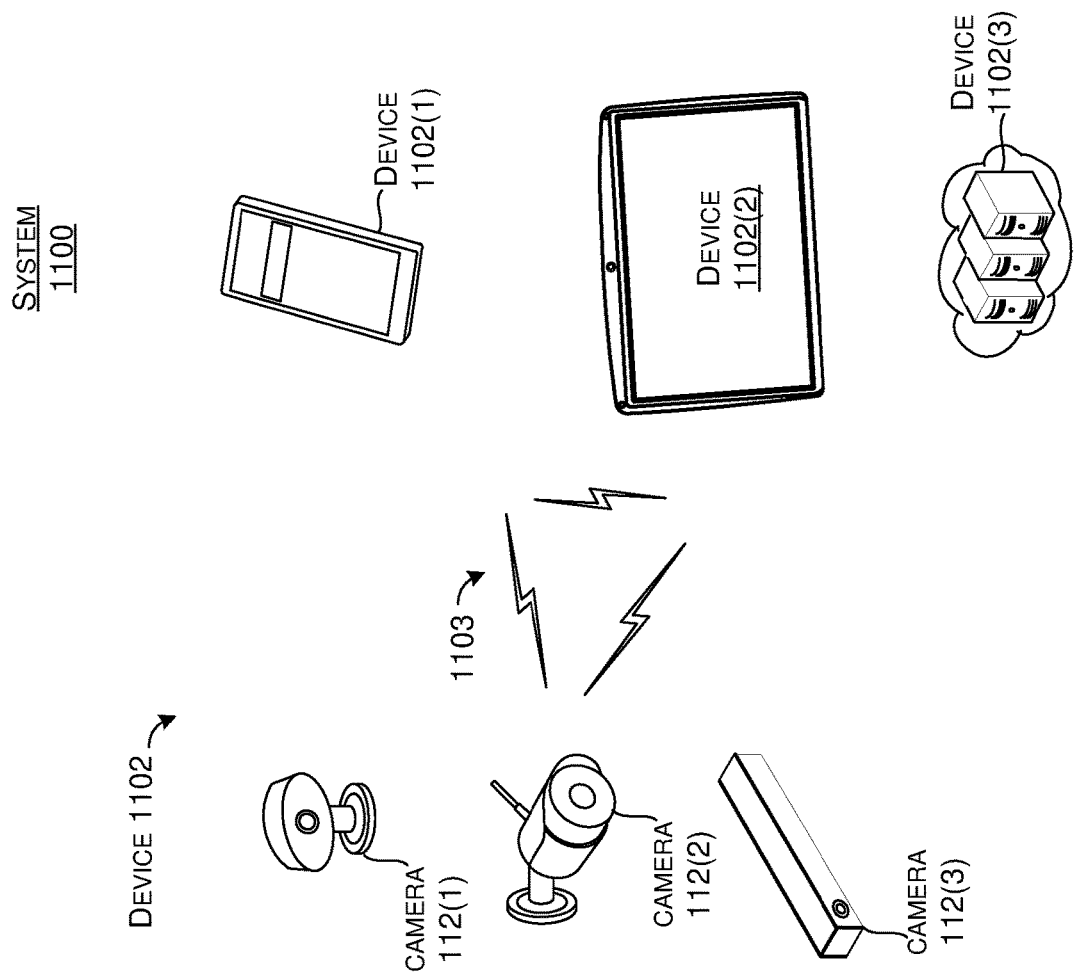

FIG. 11 shows an example system 1100 that can provide interactive visual guidance to achieve camera calibration. For purposes of explanation, system 1100 can include various devices 1102 that can communicate via networks 1103 represented by lightning bolts. The devices can include various cameras, such as webcam type camera 112(1), security type camera 112(2), and/or gaming type camera 112(3), among others. The devices can also include various device form factors, such as smartphone type device 1102(1), tablet type device 1102(2), server type devices 1102(3) and/or display type devices (e.g., display 110 of FIG. 1). Further, some devices may combine these aspects. For instance, a notebook computer type device can include a camera and a display. The notebook computer may be operated in a constrained environment and may benefit from the calibration of its camera and present calibration instructions on a GUI on its display.

In other cases, multiple devices may function cooperatively. For instance, as shown in FIG. 1, camera 112 and display 110 may communicate with another device, such as a local desktop computer or a remote server (e.g., device 1102(3) of FIG. 11) to collectively accomplish camera calibration.

The devices 1102 can include a communication component 1104, a processor 1106, storage 1108, optics 1110, sensor 1112, and/or a calibration component 1114.

The calibration component 1114 can be configured to identify a first horizontal distance from the camera to the user in a first image of a user that captures the user's upper body but not necessarily the user's whole body. The calibration component 1114 can be configured to identify a second horizontal distance from the camera to the user in a second image of the user that captures the user's upper body but not necessarily the user's whole body. The calibration component 1114 can be configured to estimate a distance and a direction separating the user in the first image and the second image. The calibration component 1114 can be configured to determine a height of the camera, a tilt of the camera, and a focal length of the camera utilizing the first horizontal distance, the second horizontal distance, and/or the distance and direction. The calibration component 1114 can be configured to calibrate the camera based at least in part on the height of the camera, the tilt of the camera, and/or the focal length of the camera. Examples of how these aspects can be achieved are described above.

FIG. 11 shows two device configurations 1116 that can be employed by devices 1102. Individual devices 1102 can employ either of configurations 1116(1) or 1116(2), or an alternate configuration. (Due to space constraints on the drawing page, one instance of each configuration is illustrated). Briefly, device configuration 1116(1) represents an operating system (OS) centric configuration. Device configuration 1116(2) represents a system on a chip (SOC) configuration. Device configuration 1116(1) is organized into one or more applications 1118, operating system 1120, and hardware 1122. Device configuration 1116(2) is organized into shared resources 1124, dedicated resources 1126, and an interface 1128 therebetween.

In configuration 1116(1), the calibration component 1114 can be manifest as part of the processor 1106. Alternatively, the calibration component 1114 can be manifest as an application that operates in conjunction with the processor 1106. In configuration 1116(2), the calibration component 1114 can be manifest as part of the processor 1106 or a dedicated resource that operates cooperatively with the processor 1106.

In some configurations, each of devices 1102 can have an instance of the calibration component 1114. However, the functionalities that can be performed by calibration components 1114 may be the same or they may be different from one another. For instance, in some cases, each device's calibration component 1114 can be robust and provide all of the functionality described above and below (e.g., a device-centric implementation, such as may be employed in a notebook computer).

In other cases, some devices can employ a less robust instance of the calibration component 1114 that relies on some functionality to be performed by another device. For instance, camera 112(1) may communicate images to server device 1102(3). The server device 1102(3) may have a large amount of processing resources. The server device 1102(3) could then send calibration content to display 110 (FIG. 1) for display to the user on the GUI. The camera 112(1) can detect user gestures in the captured images or could send the captured images to the server for analysis for gesture detection.

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

As mentioned above, device configuration 1116(2) can be thought of as a system on a chip (SOC) type design. In such a case, functionality provided by the device can be integrated on a single SOC or multiple coupled SOCs. One or more processors 1106 can be configured to coordinate with shared resources 1124, such as memory/storage 1108, etc., and/or one or more dedicated resources 1126, such as hardware blocks configured to perform certain specific functionality. Thus, the term "processor" as used herein can also refer to central processing units (CPUs), graphical processing units (GPUs), field programmable gate arrays (FPGAs), controllers, microcontrollers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Various examples are described above. Additional examples are described below. One example includes a system comprising a camera configured to be positioned to capture images of a user and a processor configured to identify a first horizontal distance from the camera to the user in a first image of the user that includes the user's upper body but not the user's whole body, identify a second horizontal distance from the camera to the user in a second image of the user that includes the user's upper body but not the user's whole body, estimate a distance and a direction separating the user in the first image and the second image, determine a height of the camera, a tilt of the camera, and a focal length of the camera utilizing the first horizontal distance, the second horizontal distance, and/or the distance and direction, and calibrate the camera based at least in part on the height of the camera, the tilt of the camera, and/or the focal length of the camera.

Another example can include any of the above and/or below examples where the system includes the camera and a computing device that is coupled to the camera and the computing device includes the processor.

Another example can include any of the above and/or below examples where the processor is further configured to project virtual three-dimensional (3D) content relative to a location of the user based upon the calibrating.

Another example can include any of the above and/or below examples where the determining is accomplished without any whole body images of the user and wherein the determining is also based at least in part on an estimated user height and/or shoulder width.

Another example includes a method comprising detecting an upper body of a user at a first location when the user performs a gesture, detecting the upper body of the user at a second location when the user performs another gesture, estimating a distance from the first location to the second location, and determining camera height and camera tilt angle based at least in part on the estimated distance and without capturing a full-height image of the user.

Another example can include any of the above and/or below examples where the detecting an upper body of a user at a first location comprises detecting the upper body from an image that does not include lower legs of the user.

Another example can include any of the above and/or below examples where the detecting an upper body of a user at a first location comprises detecting shoulders of the user.

Another example can include any of the above and/or below examples where the estimating a distance from the first location to the second location comprises instructing the user to take a step from the first location to the second location and determining a length of the step as a function of user height.

Another example can include any of the above and/or below examples where the method further comprises calibrating the camera based at least in part on the camera height and camera tilt angle.

Another example can include any of the above and/or below examples where the method further comprises presenting spatial relationships between the user and virtual content based at least in part upon the calibrated camera.

Another example includes a device comprising a communication component configured to communicate with other devices and a processor coupled to the communication component and configured to: generate content for presentation to a user that includes a representation of the user and calibration instructions, receive from a camera a partial body image of the user performing a gesture at a first location, generate additional content for presentation to the user that includes calibration instructions specifying user movement to a second location, receive from the camera another partial body image of the user performing another gesture at the second location, and generate further content for presentation to the user confirming calibration of the camera, the calibration based at least in part on the specified user movement, the partial body image, and the another partial body image.

Another example can include any of the above and/or below examples where the content comprises a graphical user interface and wherein the graphical user interface further includes a gesture detection zone.

Another example can include any of the above and/or below examples where the gesture detection zone is defined at least in part by a biometric feature of the user.

Another example can include any of the above and/or below examples where the biometric feature of the user comprises the user's eyes and the gesture detection zone extends from the user's eyes toward a top of the graphical user interface.

Another example can include any of the above and/or below examples where the graphical user interface provides real-time feedback to the user whether the gesture was performed in the gesture detection zone.

Another example can include any of the above and/or below examples where the device comprises a computing device that is configured to operate cooperatively with the camera and a display, or wherein the computing device includes the camera and the display.

Another example can include any of the above and/or below examples where the device is further configured to present the content on the display.

Another example can include any of the above and/or below examples where the device is further configured to send the content to the display.

Another example can include any of the above and/or below examples where the processor is further configured to generate further content that includes virtual content and interaction of the user with the virtual content which is based at least in part upon the calibration.

Another example can include any of the above and/or below examples where the specified user movement comprises a step and wherein the processor is configured to estimate a length of the step as a function of a height of the user.

Another example can include any of the above and/or below examples where the specified user movement comprises a step and a direction of the step.

Another example can include any of the above and/or below examples where the partial body image of the user does not include feet or lower legs of the user.

Another example includes a method comprising receiving a first image of a user at a first location relative to a camera, the first image including the user's upper body but does not include the user from head to toe, receiving a second image of the user at a second location relative to the camera, the second image including the user's upper body but does not include the user from head to toe, estimating a distance of the second location from the first location relative to the camera, and calibrating a height and tilt angle of the camera from the first image, the second image, and/or the estimated distance, and without requiring a head-to-toe image of the user.

CONCLUSION

Although techniques, methods, devices, systems, etc., pertaining to camera calibration are described in language specific to structural features and/or methodological acts, it is to be understood that the subject matter defined in the appended claims is not necessarily limited to the specific features or acts described. Rather, the specific features and acts are disclosed as example forms of implementing the claimed methods, devices, systems, etc.

The invention claimed is:

1. A system, comprising:
 a camera configured to be positioned to capture images of a user; and,
 a processor configured to:

identify a first horizontal distance from the camera to the user in a first image of the user that includes the user's upper body but not the user's whole body;

identify a second horizontal distance from the camera to the user in a second image of the user that includes the user's upper body but not the user's whole body;

estimate a distance and a direction separating the user in the first image and the second image;

determine a height of the camera, a tilt of the camera, and a focal length of the camera utilizing the first horizontal distance, the second horizontal distance, and the distance and direction; and, calibrate the camera based at least in part on the height of the camera, the tilt of the camera, and the focal length of the camera.

2. The system of claim 1, wherein the system includes the camera and a computing device that is coupled to the camera and the computing device includes the processor.

3. The system of claim 1, wherein the processor is further configured to project virtual three-dimensional (3D) content relative to a location of the user based upon the calibrating.

4. The system of claim 1, wherein the determining is accomplished without any whole body images of the user and wherein the determining is also based at least in part on an estimated user height and/or shoulder width.

* * * * *